(12) United States Patent
Denker et al.

(10) Patent No.: US 8,668,568 B2
(45) Date of Patent: Mar. 11, 2014

(54) METHODS AND SYSTEMS FOR DETERMINING USER LOCATION

(75) Inventors: Dennis Denker, Scottsdale, AZ (US);
Adam Sussman, Los Angeles, CA (US);
MyDung Tran Nachman, Los Angeles, CA (US)

(73) Assignee: Ticketmaster, L.L.C., West Hollywood, CA (US)

( * ) Notice: Subject to any disclaimer, the term of this patent is extended or adjusted under 35 U.S.C. 154(b) by 1768 days.

(21) Appl. No.: 11/413,062

(22) Filed: Apr. 27, 2006

(65) Prior Publication Data
US 2007/0055440 A1     Mar. 8, 2007

Related U.S. Application Data

(60) Provisional application No. 60/675,373, filed on Apr. 27, 2005.

(51) Int. Cl.
*A63F 13/00* (2006.01)
*G06Q 20/32* (2012.01)

(52) U.S. Cl.
CPC .................................. *G06Q 20/3224* (2013.01)
USPC ....... 463/17; 463/1; 463/29; 463/42; 709/217

(58) Field of Classification Search
CPC .................................................. G06Q 20/3224
USPC .................................. 463/1, 29, 42; 709/217
See application file for complete search history.

(56) References Cited

U.S. PATENT DOCUMENTS

| 4,797,677 A | 1/1989 | MacDoran et al. |
| 4,845,739 A | 7/1989 | Katz |

(Continued)

FOREIGN PATENT DOCUMENTS

| EP | 1 054 335 A2 | 11/2000 |
| WO | WO 97/13341 | 4/1997 |

(Continued)

OTHER PUBLICATIONS

Denning et al, "Location-Based Authentication: Grounding Cyberspace for Better Security", http://www.langston.com/Fun_People/1996/1996ATY.html (Apr. 22, 1996).

(Continued)

*Primary Examiner* — Dmitry Suhol
*Assistant Examiner* — Andrew Kim
(74) *Attorney, Agent, or Firm* — Kilpatrick Townsend & Stockton, LLP

(57) ABSTRACT

Methods and systems of determining the approximate location of a terminal are described herein. In one embodiment, a computer system receives from a first mobile computer terminal and/or from a communication system in communication with the first mobile computer terminal, global positioning satellite and/or cellular network location data, wherein the location data corresponds to the approximate location of the first mobile computer terminal. Based at least in part on the location data, the system determines if the first mobile computer terminal is within a first area, wherein presence in the first area is needed in order to be authorized to access a first service. The system, at least partly in response to failing to determine that the first mobile terminal is in the first area, transmits to the first mobile computer terminal location information regarding at least a first location in the first area.

53 Claims, 18 Drawing Sheets

(56) References Cited

U.S. PATENT DOCUMENTS

| | | | |
|---|---|---|---|
| 5,095,196 A | 3/1992 | Miyata | |
| 5,112,050 A | 5/1992 | Koza et al. | |
| 5,119,295 A | 6/1992 | Kapur | |
| 5,559,707 A | 9/1996 | DeLorme et al. | |
| 5,679,077 A | 10/1997 | Pocock et al. | |
| 5,757,916 A | 5/1998 | MacDoran et al. | |
| 5,855,515 A * | 1/1999 | Pease et al. | 463/27 |
| 6,023,686 A | 2/2000 | Brown | |
| 6,024,641 A | 2/2000 | Sarno | |
| 6,146,272 A | 11/2000 | Walker et al. | |
| 6,154,172 A | 11/2000 | Piccionelli et al. | |
| 6,202,023 B1 | 3/2001 | Hancock et al. | |
| 6,322,446 B1 | 11/2001 | Yacenda | |
| 6,383,078 B1 | 5/2002 | Yacenda | |
| 6,446,917 B2 | 9/2002 | Dieckmann et al. | |
| 6,449,346 B1 | 9/2002 | Katz | |
| 6,522,875 B1 | 2/2003 | Dowling et al. | |
| 6,671,633 B2 | 12/2003 | Kramb et al. | |
| 6,688,976 B1 | 2/2004 | Tulley et al. | |
| 6,704,489 B1 | 3/2004 | Kurauchi et al. | |
| 6,738,322 B2 | 5/2004 | Gobburu et al. | |
| 6,761,633 B2 | 7/2004 | Riendeau et al. | |
| 6,824,464 B2 | 11/2004 | Weil et al. | |
| 6,829,644 B2 | 12/2004 | Aufderheide | |
| 6,845,361 B1 | 1/2005 | Dowling | |
| 6,869,358 B2 | 3/2005 | Yacenda | |
| 6,901,429 B2 | 5/2005 | Dowling | |
| 6,965,914 B2 | 11/2005 | Dowling | |
| 6,987,734 B2 | 1/2006 | Hundemer | |
| 7,018,292 B2 | 3/2006 | Tracy et al. | |
| 7,022,017 B1 | 4/2006 | Halbritter et al. | |
| 7,035,626 B1 | 4/2006 | Luciano, Jr. | |
| 7,035,932 B1 | 4/2006 | Dowling | |
| 7,085,818 B2 | 8/2006 | Brown et al. | |
| 7,124,062 B2 | 10/2006 | Gebhart | |
| 7,305,398 B2 | 12/2007 | Teicher | |
| 2001/0018660 A1 | 8/2001 | Sehr | |
| 2001/0037211 A1* | 11/2001 | McNutt et al. | 705/1 |
| 2001/0039204 A1 | 11/2001 | Tanskanen | |
| 2002/0046131 A1 | 4/2002 | Boone et al. | |
| 2002/0052786 A1 | 5/2002 | Kim et al. | |
| 2002/0052965 A1 | 5/2002 | Dowling | |
| 2002/0138325 A1 | 9/2002 | Mashimo et al. | |
| 2002/0151344 A1 | 10/2002 | Tanskanen | |
| 2003/0003984 A1* | 1/2003 | Petruzzi | 463/17 |
| 2003/0003988 A1* | 1/2003 | Walker et al. | 463/21 |
| 2003/0013530 A1 | 1/2003 | Lauzon | |
| 2003/0023547 A1 | 1/2003 | France et al. | |
| 2003/0060264 A1 | 3/2003 | Chilton et al. | |
| 2003/0061147 A1 | 3/2003 | Fluhr et al. | |
| 2003/0152200 A1* | 8/2003 | Bruce et al. | 379/88.18 |
| 2004/0111369 A1* | 6/2004 | Lane et al. | 705/40 |
| 2004/0204235 A1 | 10/2004 | Walker et al. | |
| 2004/0205065 A1* | 10/2004 | Petras et al. | 707/5 |
| 2004/0259626 A1 | 12/2004 | Akram et al. | |
| 2005/0071417 A1 | 3/2005 | Taylor et al. | |
| 2005/0176490 A1 | 8/2005 | Wright | |
| 2005/0197190 A1 | 9/2005 | Amaitis et al. | |
| 2005/0278117 A1 | 12/2005 | Gupta et al. | |
| 2006/0025222 A1 | 2/2006 | Sekine | |
| 2006/0069780 A1 | 3/2006 | Batni et al. | |
| 2006/0082439 A1 | 4/2006 | Bazakos et al. | |
| 2006/0085396 A1 | 4/2006 | Evans et al. | |
| 2006/0095790 A1* | 5/2006 | Nguyen et al. | 713/186 |
| 2006/0099964 A1 | 5/2006 | Barrese et al. | |
| 2006/0126201 A1 | 6/2006 | Jain | |
| 2006/0136969 A1 | 6/2006 | Patton et al. | |
| 2006/0155857 A1 | 7/2006 | Feenan et al. | |
| 2007/0060358 A1* | 3/2007 | Amaitis et al. | 463/42 |
| 2008/0021998 A1 | 1/2008 | Wentink | |
| 2008/0243838 A1 | 10/2008 | Scott et al. | |

FOREIGN PATENT DOCUMENTS

| | | |
|---|---|---|
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 00/28485 | 5/2000 |
| WO | WO 01/03040 A1 | 1/2001 |
| WO | WO 01/52139 A1 | 7/2001 |
| WO | WO 01/54091 A2 | 7/2001 |
| WO | WO 02/04977 A2 | 1/2002 |

OTHER PUBLICATIONS

Shors, "Tribe Tries to Overtake Online Race", Spokesman Review (Apr. 7, 2002).

Hes, et al. "At Face Value" On biometrical identification and privacy, Registratiekamer, Sep. 1999; 78 pages.

Fujimura, "XML Ticket: Generalized Digital Ticket Definition Language", The W3C Signed XML Workshop—Copyright © 1999, 33 pages.

Matsuyama, et al. "Distributed Digital-Ticket Management for Rights Trading System", E-Commerce, 1999; pp. 110-118.

In, Shirley Siu Weng, "*A Proposed* Electronic Ticket Management for trading Service in Internet", Feb. 9, 2001; 7 pages.

Article from Smart Card News, "Major Players Form Proton World International", Aug. 1998, pp. 141-160.

Fujimura, et al. "General-purpose Digital Ticket Framework", NTT Information and Communication Systems Labs, USENIX Workshop on Electronic Commerce; Aug. 31-Sep. 1998.

Fujimura, et al. "Digital-Ticket-Controlled Digital Ticket Circulation", NTT Information Sharing Platform Laboratories, USENIX Security Symposium, Aug. 23-26, 1999.

Chui, et al. "Auction on the Internate—A Preliminary Study", Department of Marketing, HK Univiersity of Science and Technology; 1999, pp. 1-7.

Asokan, et al. "Semper Consortium: Advanced Services, Architecture and Design", Deliverable D10 of ACTS Project AC026, Mar. 15, 1999.

U.S. Appl. No. 09/702,794, filed Nov. 1, 2000.

* cited by examiner

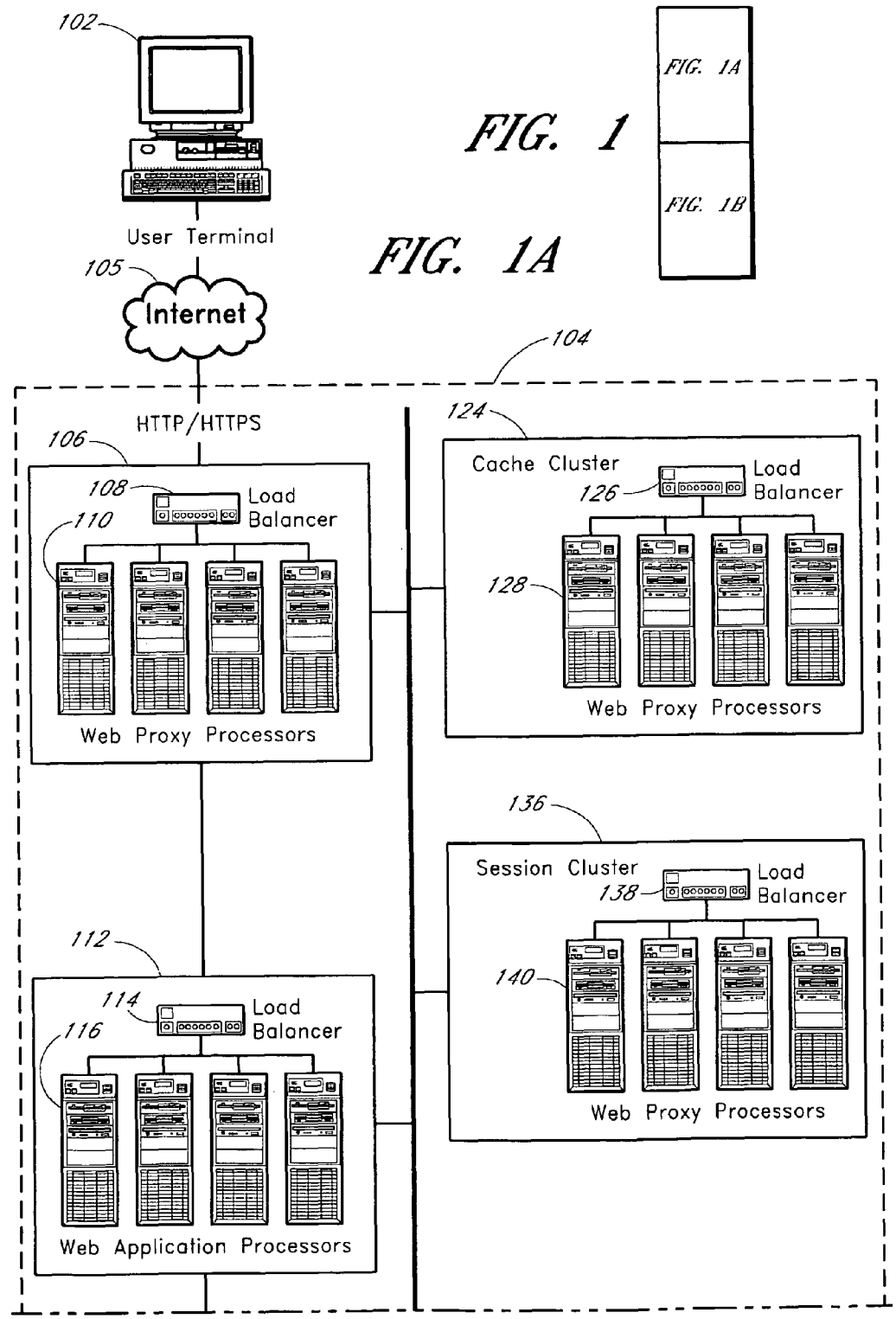

| From: | John Doe |
| Sent: | Tuesday, April 11, 2006 7:00 PM |
| To: | Roger Smith |
| Subject: | Illinois State Super Lotto |

CONGRATULATIONS
YOU HAVE ONE PICKED 5 OUT OF 6 NUMBERS IN THE SUPER LOTTO!
YOU HAVE WON $625!

FOLLOW ACCOUNT INSTRUCTIONS
ROLL OVER INTO NEW LOTTERY
DEPOSIT IN LOTTERY ACCOUNT
DEPOSIT IN IRA ACCOUNT
DEPOSIT IN CHECKING ACCOUNT
DEPOSIT IN MONEY MARKET ACCOUNT
ADD NEW ACCOUNT

SUBMIT

PROVIDE ACCOUNT
HANDLING INSTRUCTIONS

POWERBALL
CA SUPER LOTTO
MEGA MILLIONS

You may be interested in the above Lotteries. No service fees for Lottery Tickets purchased using Lottery Winnings.

Tom Petty March 22 at the Wiltern - tickets $50-$150
Bon Jovi March 24 at the Staples Center - tickets $70-$190
Bruce Springsteen April 1 at Dodger Stadium - tickets $50-$250
Aerosmith April 1 at the Forum - tickets $50-$150
Dodgers v. SF Giants April 14 at Dodger Stadium - tickets $8-$80

You may be interested in the above concerts. Receive a 10% discount on tickets purchased with your Lottery Winnings. Select concert to find tickets.

*FIG. 7*

Click on the ones you
want to invite

☐ Select All

☑ John Doe - Spends an average of $25 a month on Powerball Lotto Tickets

☑ Jane Smith - Spends an average of $24 a month on Powerball Lotto Tickets

☑ Jacob Acme - Spends an average of $20 a Month on Powerball Lotto Tickets and $15 a month on Ca. Super Lotto ☐ Jim Wong - Spends an average of $15 a month on Powerball Lotto Tickets and $25 a month on Ca. Super Lotto

SEND OUT AN
INVITATION TO JOIN
YOUR POOL!

WE THINK THAT YOU MIGHT BE
INTERESTED IN INVITING MEMBERS
FROM THE FOLLOWING LIST

[ SUBMIT ]

METHODS AND SYSTEMS FOR DETERMINING USER LOCATION

PRIORITY CLAIM

This application claims the benefit under 35 U.S.C. 119(e) of U.S. Provisional Application No. 60/675,373, Apr. 27, 2005, the contents of which are incorporated herein in its entirety.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to methods and systems of determining the location of a terminal, and in particular, to systems and methods for electronically determining the location of a terminal.

2. Description of the Related Art

While there have been attempts to distribute lottery tickets via online lottery systems, for a variety of reasons many of these online lottery systems have failed to adequately address the challenges and opportunities presented by such online lottery distribution. For example, certain conventional approaches to online lotteries have failed to efficiently provide processes and systems for validating that lottery purchasers meet governmental regulations regarding lottery purchasers, such as certain residency or age mandates, or purchase location requirements.

SUMMARY OF THE INVENTION

Example methods and systems are described for determining the location of a terminal.

One example embodiment provides a method of processing location data for a computer terminal, the method comprising: receiving at a computer system from a first mobile computer terminal and/or from a communication system in communication with the first mobile computer terminal, global positioning satellite and/or cellular network location data, wherein the location data corresponds to the approximate location of the first mobile computer terminal; based at least in part on the location data, determining if the first mobile computer terminal is within a first area, wherein presence in the first area is needed in order to be authorized to access a first service; and at least partly in response to failing to determine that the first mobile terminal is in the first area, transmitting to the first mobile computer terminal location information regarding at least a first location in the first area.

Another example embodiment provides a computer readable media that stores a program, said program capable of being executed by a computer to cause the computer to: receive at a computer system global positioning satellite or cellular network location data, wherein the location data corresponds to the approximate location of a first mobile computer terminal; based at least in part on the location data, determine if the first mobile computer terminal is within a first area, wherein presence in the first area is needed in order to be authorized to access a first service; and at least partly in response to failing to determine that the first mobile computer terminal is in the first area, transmit to the first mobile computer terminal location information regarding at least a first location in the first area.

Another example embodiment provides a method of processing location data for a computer terminal, the method comprising: receiving at a computer system location data corresponding to the approximate physical location of a first terminal; based at least in part on the location data, determining if the first terminal is within a first area, wherein presence in the first area is needed in order to be entitled to access a first service; and at least partly in response to failing to determine that the first terminal is in the first area, transmitting to the first terminal location information regarding at least a first location in the first area.

Still another example embodiment provides a method and system for managing lottery pools. An example method comprises: receiving over a network an indication from a first user that the first user is interested in forming a lottery pool; accessing historical lottery transaction data for the first user from a data store; accessing historical lottery transaction data for other users from the data store; determining which other users are relatively more suitable to be members of the lottery pool at least partly based on the historical lottery transaction data for the first user and for other users; and transmitting over the network to a terminal associated with the first user a presentation of other users with an indication that at least a first other user is more suitable to be a member of the lottery pool than a second other user.

Yet another example embodiment provides a method of processing data, the method comprising: receiving over a network an indication from a first user that the first user is interested in forming a lottery pool; identifying contacts in a contact database associated with the first user that have a lottery-related account and that have opted in to receive invitations to participate in a lottery pool; transmitting a message to the first user that identifies at least a portion of the contacts in the contact database that have a lottery-related account and that have opted in to receive invitations to participate in a lottery pool; and receiving an indication from the first user that an invitation to join the lottery pool is to be sent to at least a first of the contacts identified in the message.

An example embodiment provides a method of establishing a lottery account for a user, the method comprising: receiving a request from the user to establish an account related to lotteries; storing an electronic copy of a government document including information identifying the user, the user's age, and an address associated with the user; determining if the user is a customer of a first internet service provider; accessing a database to determine if the user is to be excluded from lottery participation; and establishing an account for the first user at least partly in response to determining that the government document information indicates that the first user meets at least one governmental rule for participating in a lottery, that the user is within the authorized area, and that the database does not indicate that the first user is to be excluded from lottery participation.

Another example provides a method of establishing a lottery account for a user, the method comprising: receiving a request from the user to establish an account related to lotteries; determining if the user is a customer of a first internet service provider; receiving personal data related to the user from the first internet service provider; and establishing an account for the first user at least partly in response to the data received from the first internet service provider.

Still another example provides a method of distributing lottery funds, the method comprising: storing in computer readable media at least one rule from a user that indicates that a first portion of a future lottery winning is to be deposited in a first account and that a second portion is to be deposited in a second account; and storing at least one rule from a governmental entity that indicates that winnings above a specified amount are to be distributed in a manner specified by the governmental entity, wherein the at least one rule from the governmental entity takes precedence over at least one rule from the user.

Yet another example provides a method of distributing lottery funds, the method comprising: storing in computer readable media a user instruction that indicates that at least a portion of a future lottery winning be automatically used to make a lottery-related purchase; determining that the user has lottery winnings; and automatically applying at least a portion of the lottery winnings to a first lottery related purchase in accordance with the user instruction.

Another example provides a method of processing a lottery-related user instruction, the method comprising: storing in computer readable media a user instruction that indicates that a lottery-related purchase is to be automatically made when a jackpot reaches a user-defined threshold; determining that a first jackpot reached and/or exceeded the user-defined threshold; and automatically applying at least a portion of the lottery winnings to a first lottery related purchase in accordance with the user instruction.

Yet another example method provides a method of processing data, the method comprising: receiving a lottery order from a first user; determining if the user is identified in a governmental database as not being eligible to participate in at least a first lottery; determining if the lottery order complies with a first user rule specified by the first user prior to the lottery order; and at least partly based on determining if the user is identified in a governmental database as not being eligible to participate in at least a first lottery and on determining if the lottery order complies with a first user rule specified by the first user prior to the lottery order, determining if the lottery order is to be fulfilled.

Still another example provides a method of recommending lotteries to a first user, the method comprising: accessing historical lottery transaction data for the first user from a computer readable data store; accessing location information for the first user; and at least partly based on the historical lottery transaction data and the location information, recommending at least a first lottery to the first user.

Another example embodiment provides a method of configuring a lottery, the method comprising: causing a form for configuring a lottery to be presented on a display, the form including the following fields: a lottery identifier; a lottery start date: a lottery end date; a lottery drawing date; date information regarding when online access to the lottery is to be provided to the public; types of bets, wherein a user can select one or more bet-types that will be permitted in the lottery; number of characters or indicia allowed in a lottery ticket or bet identifier; and a lump sum field, wherein the user can indicate that a lump sum payment option is available for the lottery.

BRIEF DESCRIPTION OF THE DRAWINGS

Exemplary embodiments are illustrated in the accompanying drawings, which are for illustrative purposes only.

FIG. 7 illustrates an example lottery notification.

FIG. 8 illustrates an example lottery group invitation user interface.

FIG. 10-15 illustrate example user interfaces.

DETAILED DESCRIPTION OF PREFERRED EMBODIMENTS

Figure 1B:
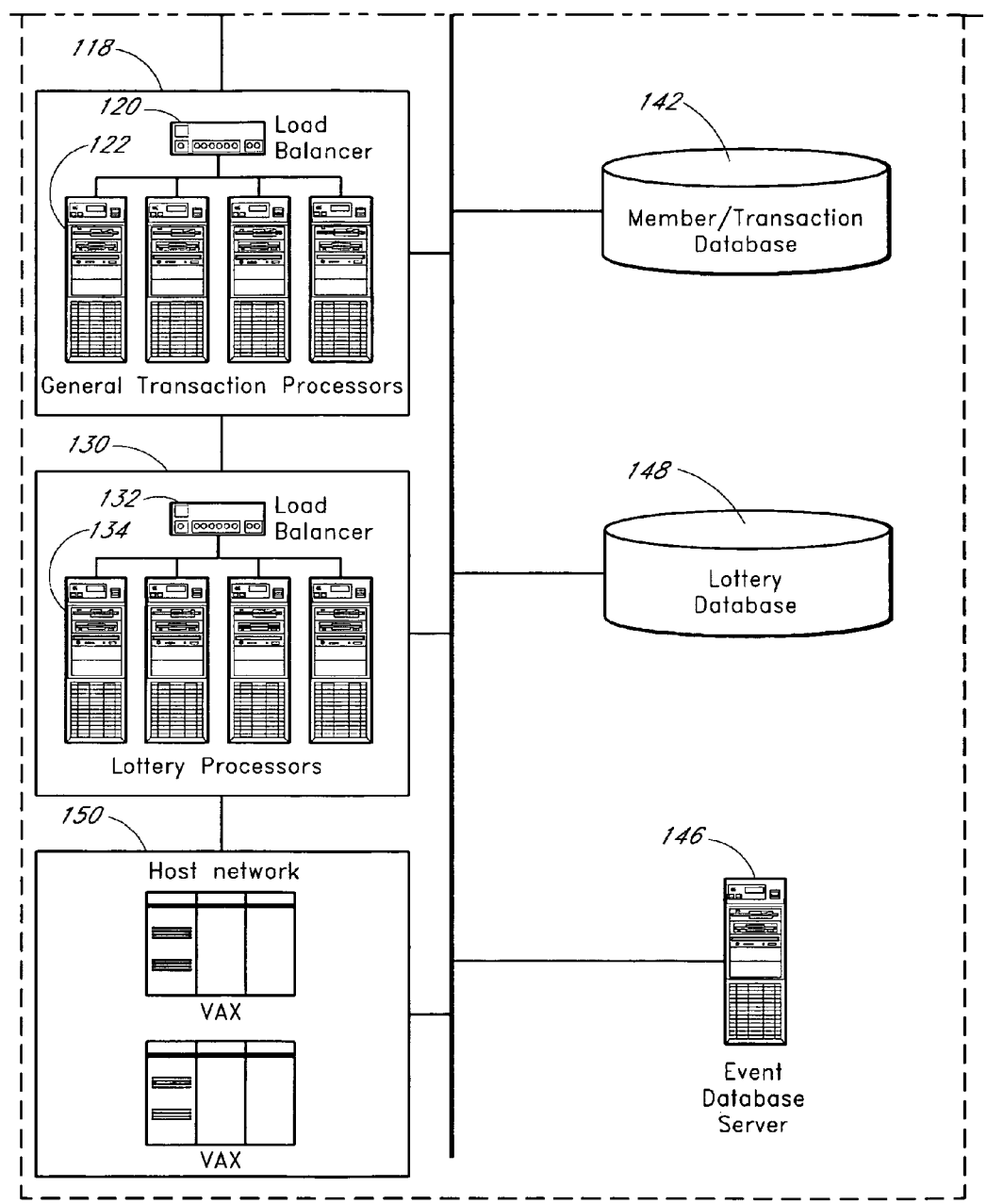
FIG. 1 illustrates an example embodiment of an apparatus that can be used in conjunction with processes described herein.

The present invention relates to electronic distribution of lottery tickets, and in particular, to systems and methods for lottery distribution and tracking.

Throughout the following description, the term "Web site" is used to refer to a user-accessible server site that implements the basic World Wide Web standards for the coding and transmission of hypertextual documents. These standards currently include HTML (the Hypertext Markup Language), which can be used to generate Web pages, and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions and networked wireless phone or terminals, and other protocols may be used as well.

In addition, unless otherwise indicated, the functions described herein may be performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a wired and/or wireless network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits.

In addition, the example processes described herein do not necessarily have to be performed in the described sequence, and not all states have to be reached or performed. Further, certain process states that are illustrated as being serially performed can be performed in parallel. Further, while the following discussion may refer to a certain government entity, such as a state, the systems and processes described herein can be used with other government entities (e.g., the federal government), or non-government entities (e.g., private corporations).

Users can optionally provide instructions and information to the lottery system described herein via Web pages, SMS messages, instant messages, interactive voice processing systems, and so on, and the user instructions and information can be stored in computer readable memory. The lottery system can optionally provide information, notification, forms and instructions to users via Web pages, SMS messages, instant messages, interactive voice processing systems, and so on.

The processes and systems described below relate to systems and processes that enable the distribution, sale, and/or tracking of lottery tickets for a lottery (e.g., an event involving chance and the awarding of one or more prizes, such as a monetary or other prize, wherein a user optionally pays to participate in the lottery). However, the lottery systems and processes described herein can optionally also be used to sell or auction other items, such as event tickets (e.g., to an event that takes place at a venue, such as a sporting event or a concert) or the like. The term "lottery ticket" as used herein, is not limited to a physical ticket, but can be any form of a right to participate in a lottery (e.g., an alphanumeric or other code, an electronic key, etc.). Furthermore, electronic lottery tickets can be emailed to a user who can print out the lottery tickets, lottery tickets can be downloaded via a Web page, or tickets can be conventional lottery tickets mailed or otherwise delivered to a purchaser, such as via a ticket kiosk.

Certain states that are considering permitting the online distribution of lottery tickets are considering imposing one or more mandates on whom the state's lottery tickets may be sold to. For example, a state may mandate that a lottery ticket purchaser be of a certain minimum age (e.g., 18 or 21 years old), or may mandate certain residency requirements (e.g., that the lottery ticket purchaser be a state resident, or that the lottery ticket purchaser be a U.S. resident), or location requirements (e.g., that the purchaser be within the state). Still additional mandates may be provided. For example, there may be a prohibition of selling lottery tickets to individuals that are on a certain list or whose names are stored in a certain database (e.g., a database storing names of parents that owe child support payments, a database storing names of prison inmates, a database storing names or other identification information for those on watch lists, such as terrorist watch lists, or a watch list directed to those that are suspected of laundering money, etc.).

One or more processes can be utilized to verify, with a certain degree of confidence, that a ticket purchaser meets one or more governmental mandates. Optionally, a lottery distribution system can require that purchasers, and/or potential purchasers, provide credentials (e.g., copies or certified copies of a birth certificate, a social security card, a driver's license, a governmental identity card, a passport, a bill mailed to the purchaser, etc.) via the mail, present copies or original identification through a physical outlet, or provide the credentials electronically over a network. The physical outlet can be a ticket sales outlet, a lottery specific outlet, or a government office. Optionally, the identification documents can be scanned in or electronically read and stored in computer readable memory. In addition, a biometric scan of the user can be made (e.g., one or more of a fingerprint, eye scan, or voice scan), and the results can be stored in computer readable memory for later use by the lottery system for manual or automatic identification and verification purposes.

A user account can then be set up on an electronic networked lottery system. The user account information can be stored in a user account database (e.g., the member/transaction database 142 described below) that stores user contact information, billing information, preferences, account status, and the like. In addition, the user account database can optionally store electronic copies of one or more identification documents and/or biometric scan. The user can also select or be assigned a user identifier and/or password which can be stored in the user account database. Once the user account has been established and the user has been validated as meeting certain criteria, the user can then begin using the account and/or purchasing lottery tickets as described herein.

In addition, the lottery system can receive over a network and store information validating a user's identity, age, residency, or other characteristics. For example, the lottery system can host a lottery Web site, including a plurality of Web pages. A user can access the lottery system via a user terminal, such as a personal computer, an interactive television, a networkable programmable digital assistant, a computer networkable wireless phone, and the like. The user terminal can include a display, keyboard, mouse, trackball, electronic pen, microphone (which can accept voice commands), other user interfaces, printer, speakers, as well as semiconductor, magnetic, and/or optical storage devices. For example, the lottery system can present queries to the user via a Web page form, or otherwise, asking for certain information, such as one or more of the user's address, age, name, driver's license number or identifier, government identification number or identifier, etc. The lottery system can use some or all of the information to determine if the user meets the qualification for a particular lottery.

The lottery system can optionally access, directly or via a third party, a state database, such as a state driver license database, to determine the user's residence, age, etc., wherein certain information provided by the user (e.g., license number, address, phone number, etc.) can be used to locate and access the appropriate driver license database entry. User information can be gathered from still other sources. For example, based on billing information provided by a user (e.g., a credit card number), the lottery system can automatically access from one or more public, governmental, or private third party databases the user's residence, age, etc., in order to validate that the user is eligible to purchase a lottery ticket and/or to verify the user's billing information. For example, the lottery system can submit to a third party certain information (e.g., name, address, age, driver's license number, social security number, and/or the like) collected from a potential lottery ticket purchaser, which can then verify that the user is the claimed age and resides at the claimed address. The verification, or failure thereof, can then be transmitted back to the lottery system.

By way of further example, the lottery system may optionally access a state database of people who are not to be permitted to participate in a lottery, and the lottery system can store an indication in its own computer memory not to sell lottery tickets to that user.

Optionally, the lottery system can limit online sales of lottery tickets to users that have accounts with specific service providers, such as selected Internet service providers (ISPs). Thus, optionally, if a user has an account with one of the selected ISPs, the user can opt-in to be able to purchase online lottery tickets, and can provide the ISP with the user's characteristics or personal information (e.g., age, residency, etc.). The lottery system can then access and/or copy the information gathered and stored by the service provider in order to determine if a user is able to purchase a lottery ticket for a given lottery.

Optionally, the validation process is performed after determining that a user is a lottery winner. Thus, for example, a user may be allowed to purchase a lottery ticket without checking, or without as fully checking, as to whether the user meets the lottery criteria (e.g., age or residency). If the user is a lottery winner, then user characteristics (e.g. age or residency) can be checked before the user is paid the lottery winning, as described above, to determine if the user meets the lottery rules. If the user does not meet the rule requirements, then the user's right to participate in the lottery is invalidated and the user is not paid the lottery winnings. Optionally, if invalidated, the user may be refunded the lottery ticket purchase price, or a portion thereof, and any associated delivery and/or processing fee is refunded as well. Optionally, if invalidated, the user may be refunded the lottery ticket purchase price, or a portion thereof, and any associated delivery and/or processing fee is not refunded. Optionally, if invalidated, the user is not refunded the lottery ticket purchase price, processing fee or delivery fee.

For example, the lottery system may also store lottery participation rules for one or more states. Because different states may have different rules and lottery ticket participation criteria, the lottery system may permit a given user to participate in certain state lotteries, and not allow the user to participate in lotteries of certain other states, based on state lottery rules and/or applicable federal regulations, and certain user characteristics (age, residency, etc.). For example, if a user attempts to purchase a lottery ticket for a given state via an online process, the lottery system can check certain user characteristics against that state's rules. If the user does not satisfy the state's rules, the lottery system can refuse to accept the lottery ticket purchase, and can transmit a notification to the user as to the reason why the purchase offer was refused. In addition, the lottery system can optionally support multi-state lotteries (e.g., the Powerball lottery). Optionally, the lottery system can check the user's characteristics (e.g., age, residency) against each one of the rules of the states participating in the multistate lottery, until a determination is made that the user satisfies the rules of a participating state, as which point the user is validated to participate in the multi-state lottery.

Optionally, the lottery system stores mapping data, including the latitude and longitude of borders of state, countries, and so on. The lottery system can also store data on locations within the state, such as within a certain distance from the state border, wherein when certain location information is provided via a user terminal while at such locations, the lottery system can verify that the terminal is within the state. In addition, the lottery system can store location information for retail lottery terminals within a given state.

Optionally, there may be limits placed on how many lottery tickets a particular user can purchase, and/or limits on the amount a particular user can spend on online lottery tickets within one or more time periods (e.g., per day, week, month, and/or year) or for a given lottery drawing or sale. The limit can also be based on historical purchase information. For example, if the user has purchased a certain average dollar amount over a given period of time, the user may be prevented from purchasing more than a certain dollar amount of tickets in another period of time unless an additional validation process is performed. The limits can optionally be set by the user as part of the user account set-up, by the lottery system (e.g., in accordance with state rules or lottery system rules), or by the user's credit card issuer, etc. Optionally, the user can have a credit or prepaid amount associated with their lottery system account and the user can optionally be allowed to use the total account amount to purchase lottery tickets without the foregoing dollar amount restrictions applying. Optionally, the amount can be automatically (e.g., on a periodic basis on in response to a trigger, such as the user's account balance falling to a predefined threshold) or manually replenished via a bank account, debit card, or credit card. Optionally, the lottery system can not make all or a portion of the account amount available for lottery ticket purchases for a predetermined amount of time to prevent impulse or compulsive buying of lottery tickets.

Optionally, in order to reduce the incidence of losing lottery ticket purchasers attempting to cancel credit card charges (a "chargeback") for the losing lottery ticket one or more of the following processes can be performed:

1. Store in computer readable memory a maximum lottery ticket charge limit per credit card. The lottery system then tracks the pending charges to the credit card for lottery tickets, and refuses further charges if such charges would result in the maximum lottery ticket charge limit being exceeded.

2. The lottery system can track the number and/or amount of charges that have been declined or charged backed by a user, and if the number and/or amount exceed a predetermined threshold (e.g., 0 chargeback events, 2 chargeback events, $75 in charge backs, 0 declines, 3 declines, etc.) stored in computer readable memory, refuse further charges and/or further lottery ticket purchases.

3. The lottery system can track the number and/or amount of charges that have been declined or charged backed by a user, and if the number and/or amount exceed a predetermined threshold (e.g., 0) stored in computer readable memory, report the matter to an entity (e.g., a government entity) for a fraud investigation. In addition, such thresholds can be determined statistically such that total net losses to the lottery system across all purchasers or a selected subset of purchases are set at a certain threshold.

If the user has a lottery system account, the user can opt-in, via a lottery system user interface (e.g., a Web page form) or otherwise, to have all or a predetermined amount or percentage of future lottery winnings rolled over into another lottery (e.g., the next lottery) using one or more of the betting methods described herein. The user can optionally also specify that winnings are to be directly deposited in the user's lottery system account, a specified bank account, money market account, annuities account (e.g., the winner can select between half of the jackpot being paid immediately or the full jackpot paid out yearly over 20 years), or other account.

For example, optionally the user can specify that all or a percentage of winnings be deposited in an account associated with a merchant, such as a ticket seller (e.g., an entity that sells, on its on behalf and/or as an agent for others, tickets to sporting events, concerts, shows, fairs, other entertainment events, an entity that sells airplane, train, or bus tickets, or other products or services). Optionally, a multiplier factor can be applied (e.g., by the merchant or other entity) to the deposited amount (or to amounts deposited in an account associated with the lottery system) when used to purchase goods or services from the merchant or other authorized entity. For example, a multiplier of 1.1 can be applied, wherein if $100 is deposited, and the user wishes to use the $100 to purchase an item, such as a ticket, from the merchant, the merchant will treat the $100 as $110. Similarly, the merchant can provide a price reduction expressed as a discount (e.g., a 10% or other discount) for purchases made using lottery funds. Optionally, in addition to or instead of such price reductions, priority (e.g., the right to purchase before an item is offered for sale to the general public, the right to purchase more of an item than the general public, etc.) with respect to certain purchases (e.g., tickets to concerts or sporting events) can be given to a user registered with the lottery system, and/or to a user that is using lottery winnings deposited in a designated account to make purchases of the item to which priority is being given.

In order to purchase a lottery ticket online via the lottery system, the user may optionally be required to log into the lottery system. The user may be asked to provide a user identification and/or password to log in and to enable the lottery system to locate the user's account information. Optionally, the user may be issued an authentication device (e.g., hardware and/or software) which the user needs to couple to the user's computer in order to identify the user to the lottery system. For example, the user may be given an authentication device (e.g., an electronic key, smart card, etc.) that includes solid state memory storing encrypted identification and other related information. The authentication device may further optionally include a computer port interface (e.g., a USB or Firewire port) via which the user couples the authentication device to the user's computer. While logging in, the user's computer can transmit the encrypted information to the lottery system and the user will then be logged in and the user's account information located and retrieved.

Optionally, the lottery system can request that the user provide biometric information (e.g., voice, retina, fingerprint information) in order to log in and/or purchase a lottery ticket. For example, the lottery system may transmit a prompt to the user's computer instructing the user to speak one or more letters, words, and/or numbers into the user's computer microphone. Once the user performs the corresponding vocalization, the computer converts the user's voice into digital information and transmits it to the lottery system via VoIP, as an email attachment, or otherwise, and the lottery system can authenticate the user.

Optionally, the user's location can be determined as part of the validation process (performed as part of a login, when a purchase is requested, during a payment or checkout process, or at other times). For example, if a state mandates that a lottery buyer be present in the state and not in specified Federally-controlled land within a state, such as Indian reservations and certain waterways, while buying a lottery ticket online, the lottery system operator (or other entity) can provide a GPS module (e.g., in the form of a secure dongle that plugs into a computer terminal interface, such as a USB, Expresscard, Firewire, or other interface) and/or GPS-related software that transmits, via the computer and over a network (e.g., the Internet) the location (and/or data via which the location can be determined) of the computer terminal being used to make the purchase. In this example embodiment, a lottery ticket will not be sold by the system if the terminal is outside of the authorized region.

In addition or alternatively, if the lottery ticket purchase is being made via a cellular, mobile phone, the approximate location of the mobile phone can be determined via data from the GPS receiver embedded in the phone or data from the cell antenna tower (or towers) via which the mobile phone is communicating when ordering the lottery ticket (e.g., within 150-50 meters, or less). For example, triangulation from multiple towers can provide fairly precise location data. In certain situations (e.g., where the user mobile phone is communicating via an antenna on or very close to the state border) it may be difficult to tell in which state the user mobile phone is located. Optionally, two or more methods may be used to identify a user location. For example, the system may receive a GPS reading (e.g., from a user terminal, such as a computer or cell phone equipped with a GPS receiver) and cell phone location information for a user, and use both types of information to verify that the user is located in an authorized location. Similarly, the system may receive a GPS reading and an IP address associated with a user terminal, and use both types of information to verify that the user is located in an authorized location.

Optionally, to the extent the location data is ambiguous or there is uncertainty regarding whether the computer terminal or phone is in a authorized location (e.g., within the borders of a state associated with the lottery), such as might occur in an area along the state border (a buffer area, such as 100 meters, 500 meters, 1000 meters, or 2000 meters from a state border, or from a localized portion of a state border), a lottery ticket will not be sold by the system in response to an order placed via the terminal or phone. Optionally, the lottery system can transmit a notification to the user indicating that the system has not been able to verify the user's location, and notifying the user that the user can try again when the user is at another location within the authorized state. Similarly, if the user's location is determined to be outside of the authorized location, or the user's location cannot be determined at all (e.g., if there is no GPS reception and/or no cell phone network coverage), a notification to that effect can be transmitted to the user's terminal, further advising the user to try again when the user is at another location (e.g., within the authorized location) [covered in 44].

Optionally, the notification can provide the user with specific or general directions to a location (e.g., an address, such as that of a store, restaurant, or coffee shop (e.g., paying an affiliation fee to the lottery system operator or state or optionally not paying such a fee), an intersection, a general direction, such as "move 500 feet west", etc.) where the system can, or is likely to be able to verify that the user is within the authorized state. Optionally, a map can be transmitted or otherwise provided to the user terminal, with various locations within the authorized state emphasized (e.g., by color, or graphical push pin). Optionally, one or more emphasized locations can be identified as having a co-located lottery terminal (e.g., a fixed terminal, optionally, with lottery ticket printing capabilities). For example, the map and/or listing of locations can optionally identify those locations within an approximate specified distance of the user terminal (e.g., within 1 mile, 5 miles, etc.) and/or that are within the same zip code as the terminal's current estimated location.

The lottery system can process a variety of lottery types and user bets (e.g., wherein the user purchases a lottery ticket with an associated number, alphanumeric, or other combination, wherein lottery winners are those whose combination corresponds to those pulled or otherwise selected in a lottery drawing), optionally including one or more of the following:

1. User bet wins on N numbers or less (e.g., 6 numbers wins the large jackpot, 5 wins less, 4 wins even less, 2 doesn't win, etc.)

2. User bet wins on exactly N numbers, with a higher jackpot amount. This bet is similar to "Bet wins on N numbers or less", except, for example, the user forgoes the chance of winning on 4 or 5 numbers in favor of a potentially larger 6 number jackpot based on a share of the 4 and 5 number winners who opted out of winning anything but the jackpot.

3. Bets representing groups of individuals with shares. The lottery system provides a user interface enabling groups of individuals to register as a group, each one contributing a certain amount of money. A group leader may be appointed that identifies group members and selects or provides a group name via an electronic form. The group members pool their bets and the lottery system automatically splits winnings based on dollars contributed or the percentage to the total contributed by a given group member. Advantageously, this can prevent cheating by a group member or leader. Optionally, different group members can contribute different amounts for a given bet. For example, each group member may optionally be able to specify via a lottery system Web form an amount to be contributed to a group lottery purchase, and optionally a group member can remove their group membership. Optionally, the lottery system reports the amount of federal and/or state tax owed by each group member and/or optionally causes tax to be withheld from a corresponding lottery payout.

4. Numbers selected by the user, wherein the user selects the numbers the user is betting on to win the lottery.

5. Numbers selected randomly by the lottery system or government lottery system.

6. Numbers selected by the lottery system or government lottery system (as requested by the user) to enhance or maximize individual pay-out (e.g., numbers least used by other users in combination for a given lottery or a given group of lotteries).

7. The lottery system or government lottery system chooses numbers (as requested by the user) for the user based on bets placed in the lottery so far. For example, number combinations that are more likely to be selected by many users may be avoided (e.g., numbers that correspond to the date of the lottery may be less desirable bets, because if they win they end up being more heavily bet upon by many users, with the winnings shared).

The lottery system can support different lottery jackpot size determinations, optionally including one or more of the following:

1. Jackpot size is based on total number of tickets purchased and/or total dollar value of tickets purchased.

2. A multiplier is applied to the jackpot based on total number of non identical tickets a given user purchased. The multiplier can be selected to act as an incentive to increase sales and lottery profits. Optionally, the value of increased sales from this incentive is split between the state (or other lottery host) and purchaser(s). For example, a certain larger jackpot bonus or boost can be contributed to the jackpot (and eventually paid) when the ticket sales for a given lottery reaches or exceeds a first threshold.

Optionally, emails, SMS communications, instant messaging, Web pages, or other communications mediums, can be used to provide user notifications when a jackpot reaches or exceeds a certain level and/or when the jackpot increases a certain amount (e.g., wherein the user can specify or select the level or increase amounts that will trigger such a communication via the user's account preferences).

The lottery system may provide a home page that provides information on upcoming or ongoing lotteries. For example, one or more incrementing tickers can be presented displaying the current jackpots of corresponding lotteries. A link can be provided on the home page, wherein the user is instructed to click on the link if the user wants to receive notifications when the jackpot size exceeds a certain threshold. Further links can be provided to purchase tickets for different lotteries.

Optionally, a user can specify, via their account set-up or otherwise, that bets (and associated ticket purchases) are to be automatically placed by the lottery system on behalf of the user when the jackpot meets and/or exceeds a certain threshold. For example, the user can specify the number of lottery tickets to be automatically purchased, how the numbers are to be selected (using for example, one or more of the betting techniques described herein), the threshold at which the lottery ticket purchase is to be performed, and/or the lotteries for which the automatic bets are to be placed (e.g., which state lotteries, which multistate lotteries, which country lotteries, etc.). The foregoing instructions can be stored in a user account database (e.g., the member/transaction database 142 described below).

Optionally, each lottery ticket can have an associated unique identifier (e.g., an alphanumeric code, a serial number, a bar code, a digital and/or visual watermark, etc.). The unique identifier can be generated or selected by the lottery system, without having to have the state or other government entity provide such unique identifier. Alternatively, the unique identifiers may be provided by another entity (e.g., a separate company, a government entity, etc.). If the lottery system generates the unique identifiers, optionally, the unique identifiers can be provided to a government entity (e.g., a state), or to a separate company or entity to use for selecting a lottery winner and/or for audit purposes. Optionally, the lottery system transmits betting information to a government entity (e.g., a state), including one or more of lottery ticket purchaser information (e.g., ticket purchaser name or other identifier), combinations chosen by corresponding lottery purchasers, and/or ticket identification information.

The actual drawing of the winning combination can be performed manually or electronically by the lottery system, a government entity (e.g., a state), or other entity. A verification process can be performed for winners. For example, optionally the validation process described above can be performed after a purchaser is determined to be a winner. Optionally, an initial validation process can be performed before a user purchases a lottery ticket, and a more extensive validation process is performed if the user's ticket becomes a winning ticket. The list of winners can be generated by the state, the lottery system, or a third party. If the state generates the list of winners (e.g., using lottery ticket and betting information provided by the lottery system, and/or unique ticket identifiers generated by the state or the lottery system), the state (via a state computer system) can electronically provide the list to the lottery system. If the lottery system generates the list of winners (e.g., using lottery ticket and betting information stored by the lottery system, and/or unique ticket identifiers generated by the state or the lottery system), the lottery system can electronically provide the list to the state (via a state computer). Optionally, a list of losing betters can be similarly generated. Winning notifications (e.g., via email, SMS, instant messaging, a Web page, etc.) can optionally be provided to winning users by the lottery system or by a government entity (e.g., a state). Losing notifications can optionally be provided to losing users by the lottery system or by a government entity (e.g., a state). In addition, a publicly available Web page can list the winning combinations. Lottery jackpots can optionally be provided to winning users by the lottery system or by a government entity (e.g., a state).

The lottery process can be audited by the state and/or the lottery system operator based on lottery information (e.g., ticket purchaser information, ticket identifiers, payments received, etc.).

The lottery system optionally stores in a database, or other data store, historical information on a given user's purchases, and can display the historical information to the given user. For example, a user account Web page can display a table listing some or all of the following: the lotteries the user has purchased tickets for, the number of tickets purchased by the user for each lottery, the dollar value of the tickets purchased per lottery, the combinations bet on for each lottery ticket purchased, the winnings (if any) per lottery and/or per lottery ticket, the lottery status (e.g., open, closed, ended, etc), whether the ticket was purchased as part of a group (and if so, the name of the group, and the percentage stake the user had in the group), the total number of tickets bought for all lotteries by the user (and/or the total number of tickets purchased by the user for a selected period of time or for the last selected number of lotteries), and the total dollar value of the lottery tickets bought for all lotteries by the user (and/or the total dollar value of tickets purchased by the user for a selected period of time or for the last selected number of lotteries). The foregoing information can be limited to that corresponding to a selected period of time.

As previously discussed, optionally, a group or syndicate can be formed wherein group members own a share or percentage of a bet. Optionally, the user can create a group or syndicate by registering a group name and password. Optionally, the user can designate group members by the user or group member manually registering a group member. Optionally, a user can send out invitations, optionally with the group name and/or password, via the lottery system to invite others to join a group. The invitation can include a link to a registration Web page on the lottery system. The registration Web page can include a group name and a password field into which the invitee would input the user name, group name, and/pr password to join the group.

For example, the lottery system can identify contacts in the user's database that are registered users of the lottery system. Those contacts can be presented to the user via a Web page, and the user can select (e.g., by clicking a check box associated with a given contact) which contacts are to receive an invitation. Optionally, registered users of the lottery system can opt-in to receiving invitations or information regarding groups seeking members. Optionally, those users that do not opt-in will not receive such invitations. A user managing or establishing a group can specify that invitations are to be sent to those users, or a selected subset thereof, that have opted in to receive such invitations. An invitation can be in the form of an email, an SMS message, a Web page, by way of example. If an invitee accepts the invitation (e.g., by clicking on an "accept" link in the invitation or in a Web page accessed via a link in the invitation) the invitee will be recorded in a lottery system database as a member of the group and the user will optionally be notified of the acceptance.

Optionally, a user can specify preferences with respect to characteristics (which can be specified as desired or required) of potential group members. For example, a user can specify that the user would prefer potential group members to live within the same city as the user, are authorized to purchase lottery tickets in one or more specified states or countries, spend at least a specified amount on lottery tickets (or at least an average amount, or at least a minimum amount a specified percentage of the time) within a given time period (e.g. a week), spend no more than a specified amount on lottery tickets (or no more than an average amount, or no more than a specified amount a specified percentage of the time) within a given time period.

By way of further example, the user can specify that it is desired or mandatory that potential group members tend to, or only make certain types of bets (e.g., bets on a certain quantity of numbers). By way of further example, the user can specify that it is desired or mandatory that potential group members have won at least a specified number of times and/or more than a specified amount of money (optionally, in a specified time period) with respect to lottery records available to the lottery system. Optionally, the user can also specify that it is desired or mandatory that potential group members have a prepaid account for purchasing lottery tickets, or that the potential group members utilize one or more specified types of financial instruments to fund lottery ticket purchases. Optionally, the user can also specify that it is desired or mandatory that potential group members are fans of a particular sport, sports team, music, and/or musical performer, or have specified hobbies.

Based on the user specified preferences and/or requirements, the lottery system can automatically present to the user a list (or other format) of potential group members (e.g., with their actual names or with nicknames/aliases), wherein the list is ordered or otherwise indicates which potential group members more closely match the user's specified preferences and/or requirements. Optionally, if the user specified certain requirements, other users that do not meet those requirements will not be included in the list of potential group members.

In addition or instead, optionally, the lottery system can examine a user's past betting history (e.g., the amount, frequency, types of bets and/or winnings), the user's eligibility to purchase lottery tickets from different entities (e.g., states or national entities), and based on one or more of the user's past betting history, winning history, and eligibility, locate other registered user's with similar characteristics. The lottery system can optionally automatically present to the user a list of potential group members, wherein the list is ordered or otherwise indicates which potential group members more closely match the user's characteristics.

Optionally, based on the user's past betting history, winnings, and/or eligibility, and, optionally, the current or predicted value of the jackpots for other lotteries, the lottery system can recommend lotteries that the user is qualified for and/or might be interested in. For example, the lottery system can use collaborative filtering, wherein a prediction is made as to which lotteries a user may be interested in based, in whole or in part, on the lottery ticket purchases made by other consumers that have similar purchase histories as the user. Optionally, other criteria can be used in performing the collaborative filtering (e.g., ticket purchases of tickets to a given type of sporting event, to sporting events associated with a particular team, to a given type of concert event, to concerts associated with a particular performer) made by the user and by others.

Optionally, the lottery system can store and provide a lottery set-up form. For example, the lottery set-up form can be stored in the lottery system and transmitted, in the form of HTML code or otherwise, to a lottery set-up person's (also referred to as a lottery administrator) terminal. The lottery set-up form can optionally include one or more of the following fields:

Lottery identifier or name;
Lottery start date;
Lottery end date;
Lottery drawing date;
Date information regarding lottery is to be placed for online access by the public;
A list of types of bets, wherein the lottery set-up person can select one or more bet-types that will be permitted in the lottery;
Maximum number of characters or indicia (e.g., alphanumeric characters) allowed in a combination;
Maximum number of tickets a user can buy for the lottery;
Annuity pay-out option;
Starting number of alphanumeric string to be used for first lottery ticket; and/or
Lottery ticket Identifier increment (e.g., increase previous number or alphanumeric string by "N").

Once the lottery set-up person provides the appropriate lottery setup instructions, the instructions can be stored in a system database for later use when running the lottery.

FIG. 1 illustrates an example system embodiment that can be used in conjunction with the lotteries and processes described herein. Not all of the illustrated systems and components need to be included in the lottery system, and other systems and architectures can be used as well. With reference to FIG. 1, the lottery system includes a user terminal 102 coupled to an example lottery system ("lottery system") 104 over the Internet 105 using HTTP/HTTPS. An example web proxy system 106 includes an optional load balancer 108 and web proxy processors 110, and can selectively block or route an inbound request from a user browser executing on the terminal 102 to an appropriate internal destination, which can be a queue or other destination server.

The illustrated example lottery system 104 includes example Web application system 112, which includes an optional load balancer 114 and Web application processors 116. A general transaction system 118 includes an optional load balancer 120 and transaction processors 122 that are used to generate transactional pages, populate data caches, provide logic and/or rules for the transaction flows, and to sequence requests. A cache cluster system 124 includes an optional load balancer 126 and processors 128. The cache cluster system 124 caches data and states for quick access by other system components.

An example lottery processor system 130 is provided that includes an optional load balancer 132 and lottery processors 134. The example lottery processors 134 conduct and/or manage the lotteries, keep track of lottery tickets, the status of lotteries, the current purchasers, the lottery jackpots, the purchase rate, and so on. In addition, the lottery processor 130 can optionally assign a unique identifier (e.g., generated by the lottery system or by a third party), to each ticket and can associate the identifier with the lottery ticket purchaser. The lottery processor system 130 can also verify if a user meets the lottery purchaser criteria (e.g., age, residency) access from the member transaction repository database 142. The use of load balancers and multiple lottery processors can enable the lottery to continue, potentially with little or no performance impact, even if a lottery system component (e.g., a processor 134) fails 104. For example, if a lottery processor fails, lottery processes that were performed by the failed lottery processor are optionally directed via the load balancer to another lottery processor. A session cluster system 136 includes an optional load balancer 138 and a plurality of processors 140 and is used to manage sessions.

A member transaction repository database 142 stores user identification information, age, residency, contact information, billing information, preferences, account status, winnings rollover instructions, lottery eligibility status, lottery group membership data, and the like, that can be accessed by other portions of the lottery system 104. In addition, the database 142 can store an opt-in indication, wherein the user has agreed to have certain lottery tickets/bets be automatically purchased when certain user specified or selected conditions (e.g., the jackpot size) occur. The database 142 can also store a user opt-in for notifications regarding lotteries, lottery status, invitations to join lottery purchase groups, or the like. The database 142 can also store a history of a user's lottery ticket purchases (e.g., lottery identifiers, the states associated with a given lottery, the amount purchased, the types of bets, the combinations selected, the amount won, etc.).

An example database 148 is provided that stores one or more of seller (e.g., lottery operator, state, federal government, etc.) rules, purchaser eligibility criteria, information on the lottery (e.g., the types of bets, the types of combinations, maximum number of lottery tickets a purchaser can buy, etc.), the date the lottery ends, etc. The database 148 can optionally store mapping data, including the latitude and longitude of borders of one or more states, or other entity wherein the boarders indicate where certain lottery sales are authorized. The database 148 optionally stores data (e.g., latitude, longitude, whether the location has a retail lottery terminal, whether the location has paid a fee for certain prominence/advertising rights) on locations within the state, such as within a certain distance from the state border, wherein when certain location information is provided via a user terminal (e.g., a mobile phone and/or a GPS receiver-equipped terminal) while at such locations, the lottery system can verify that the terminal is within the state. Optionally, a user location can also be determined using an IP address associated with the user. For example, a geolocation program executed by the system is optionally used that determines the likely physical location of an Internet visitor using routing trails and IP addresses.

A host network system 150 is provided that handles credit card processing, delivery of lottery tickets, and so on.

Figure 2:
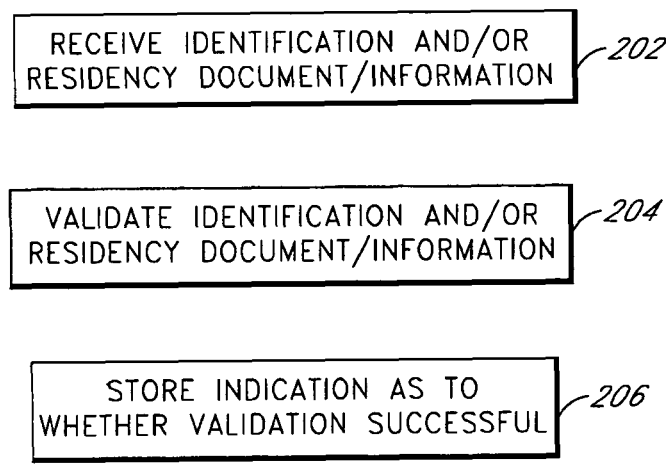
FIG. 2 illustrates an example process for receiving and verifying user information.

FIG. 2 illustrates an example process for receiving and verifying identification/residency information (e.g., including name, age, residential address, work address, billing address, email address, mobile phone number, regular phone number, credit card number and/or expiration date, etc.) for a potential lottery ticket purchaser. At state 202, the information can be received as similarly discussed above. The information can be received by the lottery system, a governmental entity, or other entity. By way of illustration, the potential purchaser can manually provide some or all of the identification information (e.g., via an online Web form) and/or the potential purchaser can provide credentials (e.g., copies or certified copies of a birth certificate, a social security card, a driver's license, a governmental identity card, a passport, a bill mailed to the purchaser, etc.) via the mail, at a physical outlet, or electronically over a network. Optionally, the identification/residency documents can be scanned in or electronically read and stored in computer readable memory.

At state 204, some or all of the information received at state 202 is verified. For example, based on billing information provided by a user, the lottery system can automatically access from one or more public, governmental, or private third party databases the user's residence, age, etc., in order to validate that the user is eligible to purchase a lottery ticket and/or to verify the user's billing information. By way of further example, the lottery system can submit to a third party certain information (e.g., name, address, age, driver's license number, social security number, citizenship and/or the like). The third party can then verify that the potential purchaser is the claimed age and resides or works at the claimed address. The verification, or failure thereof, can then be transmitted back to the lottery system and stored in computer readable memory. Optionally, the verification failure, and some or all of the information provided by the user (e.g., name, contact information, residency, etc.) can be transmitted to a government entity. If the potential purchaser information is validated and meets certain criteria (e.g., state and/or lottery system criteria, such as age, residence, and/or work location), a user account is opened. Optionally, even if some or all of the identification information is not validated, a user account can be created, but the user may be prevented from purchasing certain or all categories of lottery tickets.

Figure 3:
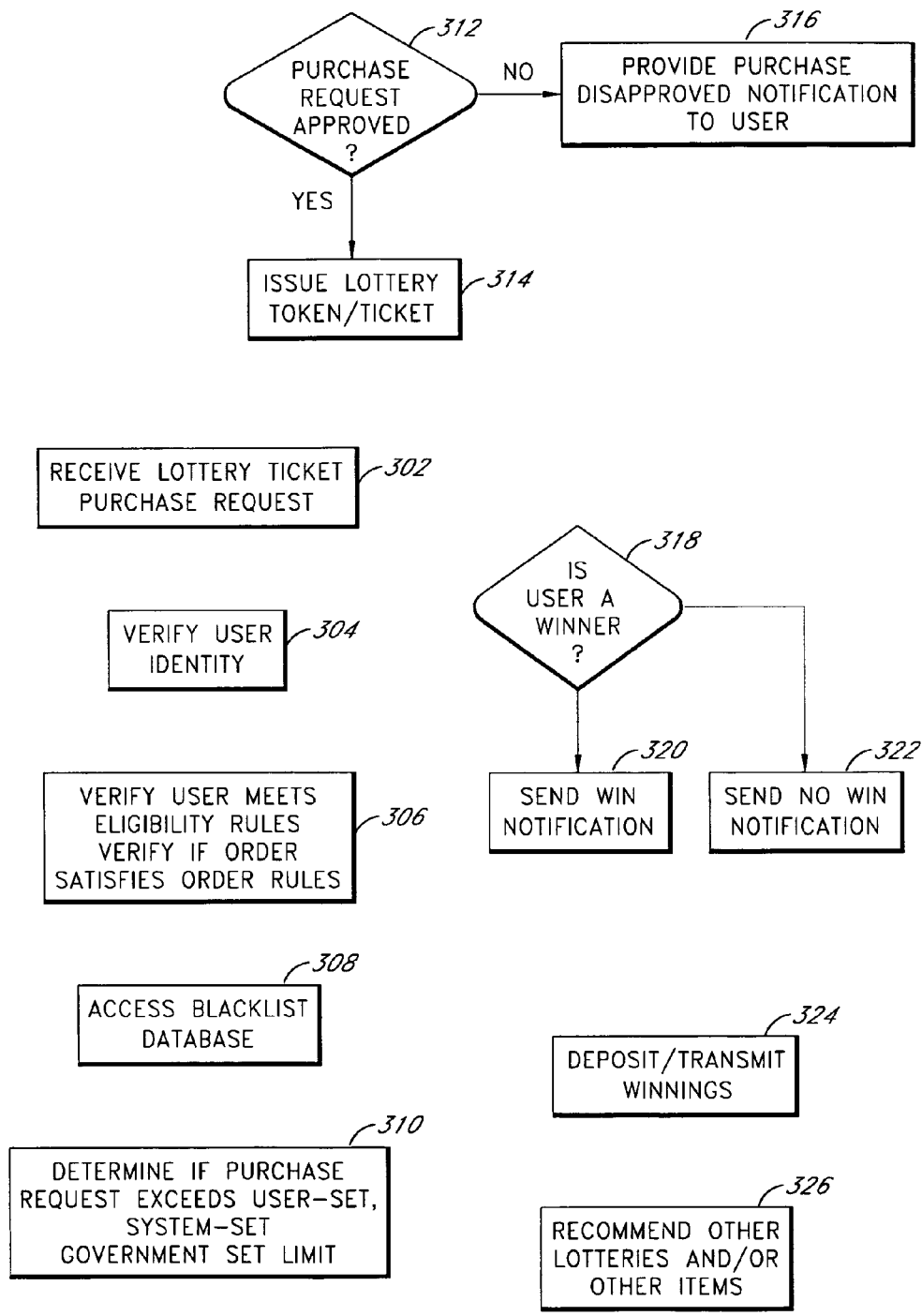
FIG. 3 illustrates another example lottery process.

FIG. 3 illustrates another example lottery related process. At state 302, the lottery system receives a lottery ticket purchase request. The request can specify, by way of example, and the number of lottery tickets desired, the type(s) of bet(s) the user wants to make.

Referring to state 304, optionally, before or after providing the lottery purchase request, the user logs into the system (e.g., by manually or automatically providing identification information, such as a user ID, password, digital key, and/or one or more biometric identifiers). Optionally, location data for the user terminal (e.g., a personal computer, an interactive television, a mobile phone) will be transmitted directly or indirectly to the lottery system (e.g., by the terminal or a device that is coupled (via a wired or wireless connection) to the terminal, such as a cellular tower). If the user identity is not verified, a notification is transmitted back to the user terminal so informing the user. The user can optionally try to log in again.

At state 306, the lottery system locates account information verifies that the user meets eligibility rules stored in the lottery system or otherwise accessed. Optionally, certain information, such as the biometric information, is compared with biometric information stored in association with the user's account, to verify the user identity. The eligibility rules can be set by the lottery system operator, the state or country associated with the lottery (e.g., in the case of a multi-state lottery, optionally rules set by one or more of the states and/or the rules of any single state participating in the multi-state lottery), the federal or national government, and/or other entity. For example, the rules can relate to residency and/or age. If the user identity is not verified, at state 316 a notification is transmitted back to the user terminal so informing the user.

At state 308, the lottery system optionally determines if the user is on a "list" (e.g., in a database) of those who are specifically not eligible to purchase a lottery ticket (e.g., a blacklist) and/or for whom a notification related to the lottery purchase request is to be provided to a third party (e.g., such as a federal, state, or city government agency or a private entity). For example, the system can access over a network (e.g., the Internet, an intranet, a virtual private network, or other network) one or more remote blacklist databases (e.g., federal, state, city, or a private entity databases) or local blacklist databases. If user identification information matches that on a blacklist, appropriate action is taken. For example, optionally a notification is transmitted back to the user terminal informing the user that the user is on a blacklist and that the user order is not accepted. Optionally instead, the user is not notified that the user is on a blacklist and the order is, or appears to the user to be, accepted and a notification related to the order (e.g., including user provided identification information, contact information, and order information) is manually or automatically provided to a government and/or private entity.

At state 310, a determination is optionally made as to whether the user order satisfies one or more rules. For example, a rule can be set (e.g., by the system operator, user, governmental entity, and/or issuer of financial instrument, such as a credit card, used to fund an order) for a selected user, a selected set of users, or for all users, regarding the frequency of lottery ticket purchases within a given time period, the quantity of lottery ticket purchases within a given time period, and/or the dollar value of lottery ticket purchases (e.g., for a given lottery, for a given purchase event, and/or within a given period).

Thus, for example, a rule can be set preventing a user from purchasing more than a specified dollar amount of lottery tickets (e.g., for a given state, group of states, and/or any states; or for a given lottery) within a specified period. This rule can be used to better ensure that a user does not overspend on lottery tickets. Similarly, a rule can be set limiting a user from purchasing more than a specified quantity of lottery tickets (e.g., for a given state, group of states, and/or any states; or for a given lottery) within a specified period. If one or more rules are not satisfied, a notification is transmitted back to the user terminal at state 316 so informing the user and optionally informing the user how to adjust the user order so that it satisfies the rules.

At state 312, a determination is made as to whether the user's order is accepted, or not (e.g., for one of the reasons discussed above, because the user has exceeded a chargeback threshold, because the user's financial instrument limit has been exceeded, because the user has had more than a threshold number of credit card charges declined, or for other reasons). If the order is not accepted, at state 316, a notification informing the user of the purchase disapproval is provided to the user via the user terminal. If the user's order is accepted (or is to appear as accepted), at state 314 a lottery "ticket", confirmation, and/or receipt is optionally issued to the user. The lottery ticket can optionally be in the form of a downloadable or otherwise printable ticket, confirmation, receipt, that includes the user's bet (e.g., the numbers or alphanumeric characters selected by the users), a lottery ticket number, and/or the user's name (and/or the name of an associated syndication group and optionally the percentage share each group member has).

At state 318, the lottery system or other entity (e.g., a state or national government or an agent thereof) selects one or more lottery winners. The lottery system or other entity compares the winning data (e.g., the winning numbers) against bets made by users and determines who is a winner. At state 320, a notification is sent to winners, optionally via a method specified by the winners in their account configuration or otherwise (e.g., by one or more of email, SMS message, Web page, etc.). Optionally, at state 322, a notification is sent to losers, optionally via a method specified by the winners in the account setup or otherwise. Optionally, a user that has purchased more than one lottery ticket can be both a winner and a loser.

At state 324, the winnings are provided to the winner as per the winner's account configuration or in accordance with the winner's instructions received after the notification was sent to the winner at state 320. For example, the winnings can be transmitted to the winner as a check, deposited in a specified account (as similarly discussed above), or the winnings can be rolled over into another lottery.

Portions of the winnings can be distributed differently. For example, the state, the winner, the lottery system operator, and/or other entity can set up one or more rules, stored in the lottery system memory, defining how winnings to a given winner are to be processed. For example, a user can specify that any winnings up to a certain dollar amount are to be automatically deposited in a first account, and that deposits over that first amount are to be automatically deposited in a second account. The state can set up a rule, which is optionally configured to override in whole or in part, user defined rules, which specifies that for any winnings over a second amount, the winner must go to a state office or a specified agent of the state in order to pick up a physical check and/or to provide identification verification information (e.g., a driver license, a tax bill, a utility bill, etc.). For example, if a user specified the first amount as $600, and the state specified the second amount as $10,001, then the first $600 would be automatically deposited in the first account, the next $9400 would be automatically deposited into the second account, and for any additional amount, the user would go to a state office or an agent of the state to arrange for the remaining payment.

Similarly, a rule can specify that a first percentage of winnings be processed in a first manner, and a second percentage be processed in another manner.

At state 326, selected other lotteries are optionally recommend to the user, as similarly discussed above (e.g., wherein the lottery system predicts the user may be interested in the selected other lotteries based on the user's eligibility, the user's past purchase history, the user's past winnings, the current value/jackpots of other lotteries, and/or collaborative filtering). Optionally, other items, such as tickets for events (e.g., sporting events, concerts, show, movies, etc.) can be recommended to the user based on user preferences and/or collaborative filtering. The user preferences may have been directly specified by user via a form, such as a Web page form, accessed during user's account set-up/maintenance, via a survey form, via a specific request by the user for information about an item (e.g., regarding an event, performer, or artist), via a request for notification when a specific item will be available (e.g., when a specific event will occur, or a team or artist will be performing in an area in which the user lives), and/or derived from past item purchase histories. Optionally, ticketed events may be selected based, in part, on the amount of the user's recent lottery winnings (e.g., winnings of which the user was notified the day the recommendations are provided or within a certain time period relative to the notification, such as a week) or winnings remaining in one or more user's accounts (e.g., an account associated with the lottery system, etc.) and on ticket prices (including or excluding shipping, handling, and service fees). For example, a recommendation can be provided for one or more events that have ticket prices no greater than the user's recent lottery winnings, such as the amount just won by the user (which may be in the form of a share of a winning group or syndicate). Optionally, a recommendation can specifically recommend a ticket for an event at a specific price or within a specific price range based on the recent winnings or winnings on deposit. By way of further example, a recommendation can be provided for event tickets that are no more than a certain specified amount or no more than a specified percentage above the user's recent winnings or winnings on account (e.g., 0% more, 10% more, or 15% more), and optionally at least a certain specified amount or percentage beneath the user's recent winnings or winnings on account (e.g., 0% less, 20% less, or 80% less, etc.).

For example, if the item is an event ticket, historical purchase information can be accessed from a local database and/or a database associated with a ticket issuer or other entity. For example, the historical purchase information can be related to the events for which tickets were purchased by the user, optionally including the performer/team, the ticket price, the number of times the user has purchased tickets for a given performer/team, the timing or dates of prior ticket purchases, etc. Optionally, the item recommendation can be provided via the same notification (e.g., the same Web page or email) as the notification regarding the user being a lottery winner. Optionally, the notification can include a "buy" control (e.g., a link or button) which, when activated will cause the item to be added to the user's electronic shopping cart or cause the purchase to be made immediately. Optionally, a control is provided via which the user can indicate that some or all of the lottery winnings be applied to the item purchase. Optionally, the notification will inform the user that a price reduction will occur if the user applied lottery winnings to the purchase. Optionally, the notification will provide a link to another user interface (e.g., a Web page) which will provide more information about the item, and via which the item can be purchased or added to the user's shopping cart.

Figure 4:
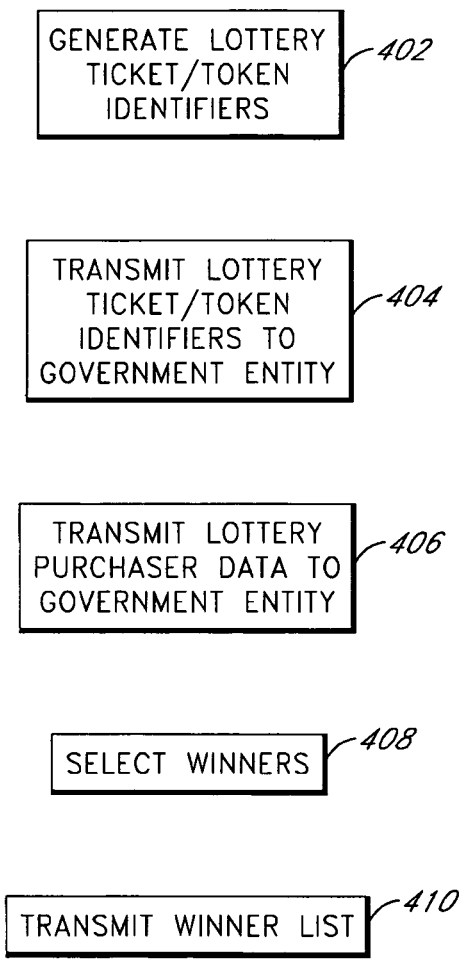
FIG. 4 illustrates yet another example lottery process.

FIG. 4 illustrates another example lottery process. At state 402, lottery ticket identifiers are generated and/or set-up. For example, a starting number or seed can be specified, and an algorithm (e.g., increment number by 1 for next lottery ticket) selected or specified. Optionally, instead, a large number of identifiers can be generated, which will be assigned to lottery tickets as they are purchased. Lottery ticket, as used herein, is not restricted to a physical ticket, and can include a lottery identifier or token stored in computer memory. The lottery ticket identification generation can be performed by a non-governmental entity (e.g., a company via the lottery system described above) or a governmental entity (e.g., a state or federal entity using the lottery system described above or a different system).

If the ticket identification generation is performed by a non-governmental entity, then optionally, at state 404, the lottery ticket identifiers are transmitted to a governmental entity. At state 406, lottery purchaser information (e.g., some or all of the following: the purchaser name, other identifier, physical mailing and/or billing address, email address, number of tickets purchased, purchase amount, financial instrument, such as credit card number, used to fund purchase, etc.) is optionally transmitted to one or more governmental entities. At state 408, lottery winners are selected (e.g., by a governmental or non-governmental entity). At state 410, winner identification is optionally transmitted (e.g., by the governmental entity to the lottery system if the governmental entity selected the winners, or by the non-governmental entity to a governmental entity if the non-governmental entity selected the winners).

Figure 5:
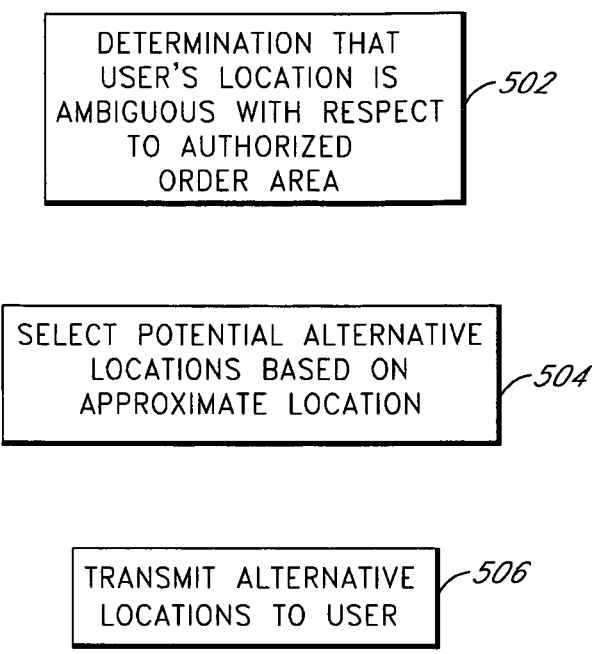
FIG. 5 illustrates an example process for providing location information to a user.

FIG. 5 illustrates an example process for providing a user with information on how to proceed to a location where the user's location can be verified as being within an authorized area (e.g., wherein the authorized area is a city, state(s), or country) for buying a lottery ticket to a given lottery. At state 502, a determination is made that the user's location is sufficiently ambiguous that a determination has not been that the user is within and/or not within an authorized area for purchasing a lottery ticket for a selected lottery. For example, the user's general location may have been determined or received by the system, but without sufficient accuracy and/or resolution to determine whether the user is within the authorized area (as might be the case if the user is right next to, or standing on the area border).

At state 504, one or more potential alternative locations are selected or identified that are within the authorized area. For example, the locations can be selected using mapping software from a database that stores location and mapping information. The locations are optionally selected based at least in part on the distance from the user terminal or the zip code in which the user terminal is currently located. For example, optionally only locations within a certain distance from the user (e.g., 0.5 miles, 1 mile, 2 miles, 5 miles, etc.) are selected, wherein the distance can be measured in a straight line from the user, via the shortest route on a paved road, or via a shortest route using a routing preference specified by the user in the user's account configuration (e.g., shortest route, quickest route, route that uses freeways/highways, route that avoids freeways/highways). Optionally, if the nearest location from the user is more than a specified amount (e.g., 10 miles), a selection is not performed. Optionally, if the user's location cannot be adequately determined, the system will access the user's address information stored in the user's account record, identify the locations of retail lottery terminals within the same zip code and/or within a certain distance of that address (e.g., 5 miles), and transmit a list of those identified retail lottery terminals and/or a mapping of the identified retail lottery terminals, to the user terminal.

At state 506, information (e.g., address, distance, map, description, etc.) on one or more of the locations identified at state 504 is transmitted to the user's terminal (e.g., via a Web page, an email, or otherwise). The ordering of the locations is optionally based on one or more of the following:

distance from user (where those closer to the user tend to be listed relatively higher up)

whether the location is equipped with a lottery terminal (e.g. a fixed, retail lottery terminal)

the location type (e.g., roadside location, a restaurant, a ticket outlet for event tickets, a supermarket, a sundry store, a gas station, a bookstore, etc.)

whether an entity associated with a location has paid a fee or has agreed to pay a fee for a preferential listing (e.g., a higher listing, and/or a listing highlighted by color, bolding, placement, animation, or otherwise)

Optionally, as similarly discussed above, if user's location cannot be determined or cannot be adequately determined, the system will identify lottery terminals within a certain distance of the address stored in the user's account record (e.g., a home address or a business address) and/or within the same zip code.

Optionally, a similar process can be performed if the system determines that the user is outside of an authorized area. For example, if the system determines that the user is outside of an authorized area but within a certain distance (e.g., 0.5 miles, 1 mile, 2 miles, 5 miles, etc.) of the authorized area (or within a certain distance of a specific portion of the authorized area, such as a portion with a road or town), a notification can be transmitted to the user terminal informing the user that the user is outside of the authorized area and providing information (e.g., an address, intersection, a map, and/or directions) on one or more locations within the authorized area.

Figure 6:
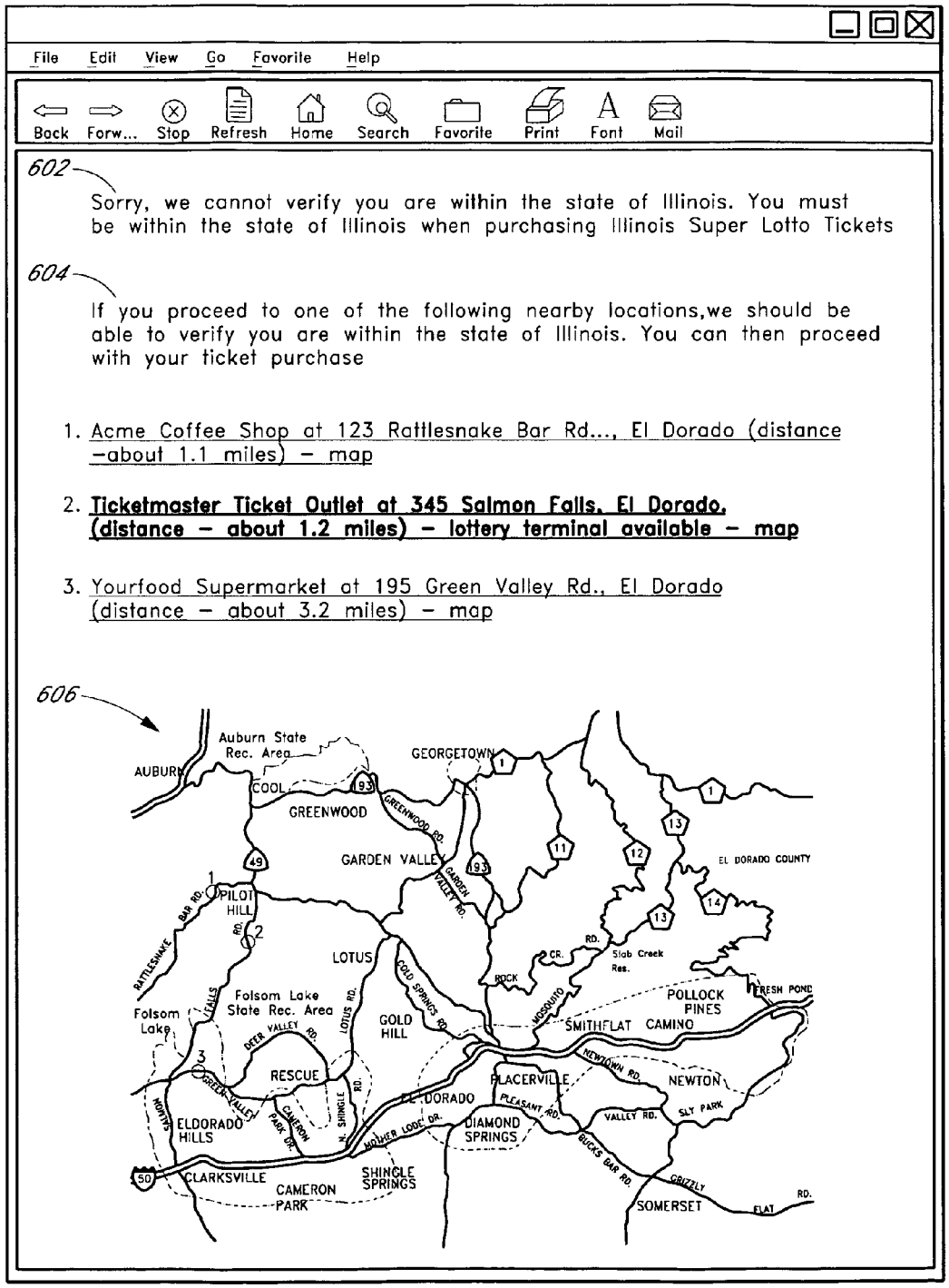
FIG. 6 illustrates an example message providing location data to a user.

FIG. 6 illustrates an example notification, such as that provided at state 506 illustrated in FIG. 5. A message area 602 includes a message that informs the user that the system could not verify that the user was within an authorized location (the state of Illinois in this example), and that the user needs to be within the authorized location in order to purchase a ticket for the lottery as per the user's lottery ticket order request. A message area 604 includes a message that informs the user that if the user proceeds to a listed location, the system should be able or is likely to be able to verify the user's location within the authorized area and that the user can then proceed to purchase the requested lottery ticket. A listing of locations is provided, which in this example, includes the location name, address, distance from the user, and a map link. An indication is also provided that a given location has a co-located lottery terminal, with the listing emphasized in bold. At map area 606, a map of the area, including some or all of the listed locations, is provided, with the listed areas optionally highlighted (e.g., by color, a number, a circle, a graphical push pin, animation, an icon, etc.).

FIG. 7 illustrates an example lottery winning notification. The notification can be transmitted, by way of example, via a Web page (or divided over several Web pages), email, or otherwise. A message 702 informs the recipient that the recipient has made a winning selection, and displays the amount won. A list box (or other interface) lists a selection of accounts and/or winning handling instructions. For example, the list can include account identifiers for accounts that the recipient had previously specified (e.g., by providing account names and numbers via the user's account set-up/maintenance user interface), an option to deposit the winnings in a default account previously specified by the user ("Follow Account Instructions"), an option to add a new account, and an option to rollover the winnings into another lottery. A submit button is provided which, when activated, will cause the user's selection to be transmitted to, and executed by the lottery system.

One or more lotteries are listed at area 706. The lotteries may have been selected based in whole or in part on the user's eligibility, preferences and/or using collaborative filtering, as described elsewhere herein. The lotteries are optionally listed using links that, when clicked on, causes a Web page (or other user interface) to be presented via which the user can make a bet and purchase a lottery ticket for the corresponding lottery. The ordering (or other emphasis) of the listed lotteries is optionally based, in whole or in part, a prediction as to which lotteries will have relatively more interest for the recipient (e.g., wherein the higher the relevancy, the higher the listing). Optionally, the ordering or other emphasis (e.g., color, bolding, placement, animation) can be based in whole or in part on a fee provided (e.g., by the lottery operator/state) for such emphasis. The recipient is optionally notified that if the recipients lottery winnings are used to purchase additional lottery tickets, then a service fee will not be charged for that additional lottery ticket purchase.

One or more items (e.g., concert, plays, shows, movies or sporting events) are listed at area 708. The items/events may have been selected based in whole or in part on the user's explicit or inferred preferences, collaborative filtering, based on ticket prices, and/or location relative to the user, as described elsewhere herein. The listing in this example includes a performer/sports team name, a performance date, a performance venue, and a ticket price range. The listing can be in the form of links. When the recipient activates an event link, the lottery system or other system causes a ticket selection and/or purchase user interface (e.g., Web page) for the corresponding event to be transmitted to the recipient terminal and presented to the recipient. The recipient is optionally notified that, if the recipient's lottery winnings are used to purchase event tickets (or a ticket to one of a specified selection of events), then the recipient will receive a price reduction.

FIG. 8 illustrates an example listing of potential invitees generated by the lottery system for a lottery group initiated and/or managed for a given user. As similarly discussed above, the list is optionally generated based on explicit user-specified preferences and/or requirements, inferred user preferences, and/or the eligibility of potential invitees to participate in a group lottery purchase for one or more lotteries that the lottery groups is intended to buy tickets in. The list is optionally ordered so that those higher are on the list are more likely to correspond to the user's preferences or requirements. The user can click on checkboxes corresponding to those potential invitees that the user wants to invite, or click on a "select all" control to invite all those listed. Once the user submits that invitee list (e.g., by click on a submit control), the system automatically transmits invitations to join the user's lottery group to the selected invitees.

Figures 9, 9A:
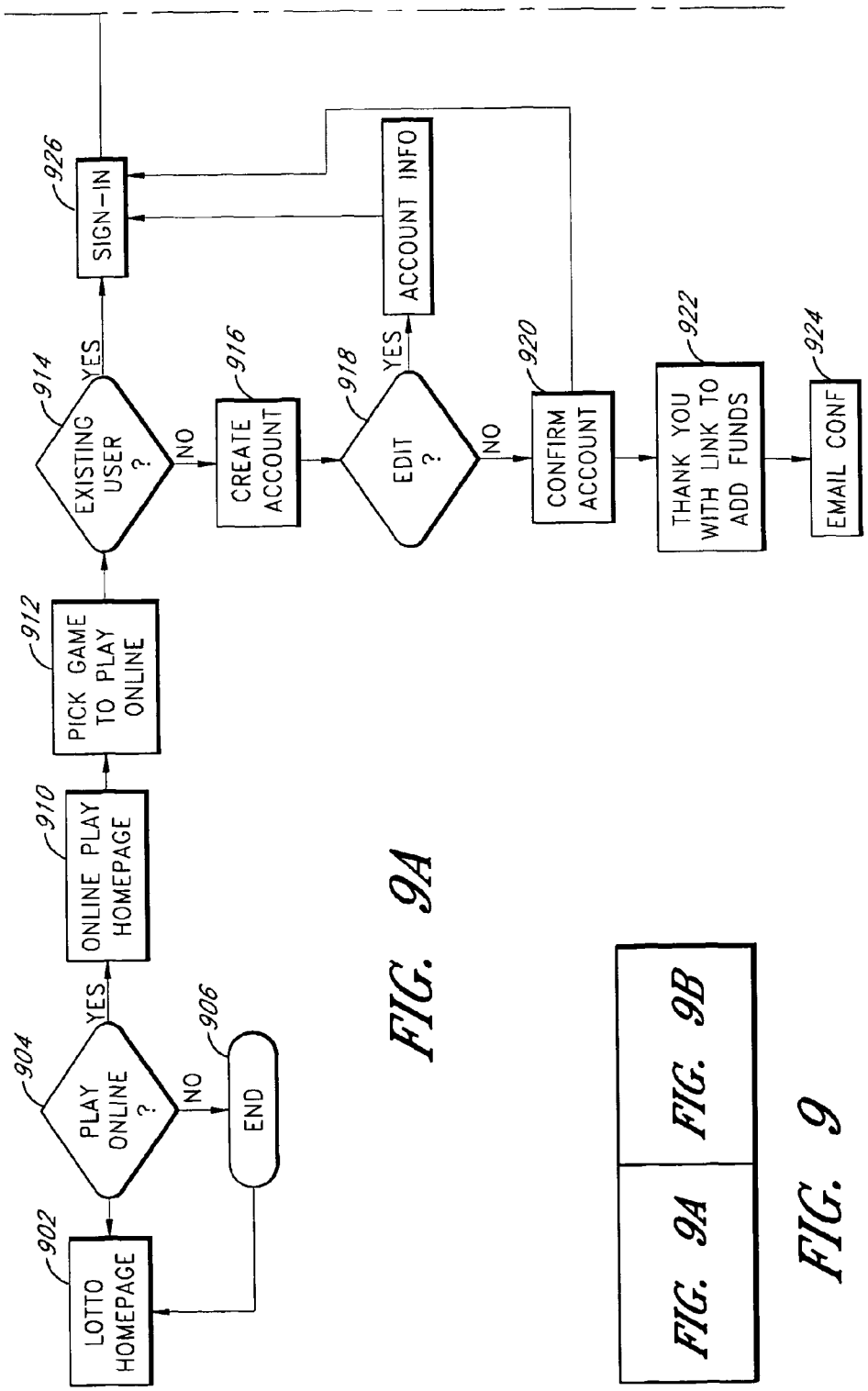
FIGS. 9A-B illustrate another example lottery process.
Figure 9B:
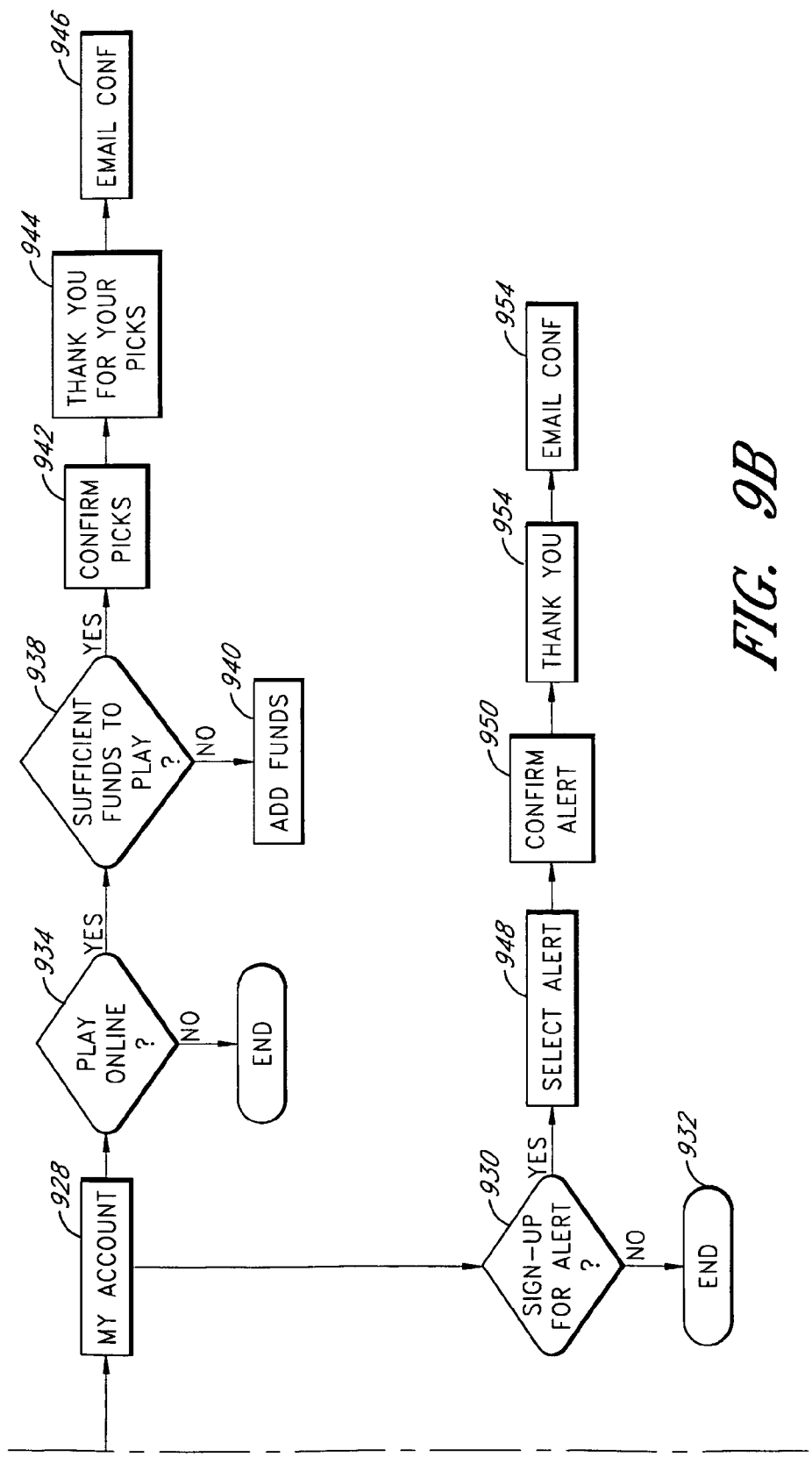

FIGS. 9A-B illustrate another example process. At state 902, a user visits a game/gambling (e.g., a lottery) Web site homepage or other page. Optionally, the Web site is hosted on a computer system (e.g., a lottery system) and operated by a state (e.g., a state of the United States or a national entity), an agent of a state, or other entity. At state 904, the system receives an indication (e.g., via a click on a corresponding link) from the user that the user is interested in playing a lottery. If the user indicates a lack of interest in playing, the process proceeds to end state 906. At state 912, the system transmits a Web page presenting one or more available lotteries that the user can elect to play. The user can select a lottery to play (e.g., by clicking on a link or other control). At state 914, a determination is made as to whether the user has an account with the system (e.g., by reading a cookie stored on the user terminal, via a client application that transmits identification information, or otherwise).

If the user does not have an account, the process proceeds to state 916, and an account is created using information received from the user via the user terminal. For example, the information can include a user name, contact information (e.g., email address, SMS address, instant messaging address, physical mail address, residential address, phone number(s)), gender, date of birth, a government issued identifier or a portion thereof (e.g., driver license number, social security number, etc), a password and/or a user ID or alias. The user may also be asked to agree to be bound by rules associated with the account and with lottery rules.

At state 918, the system presents, via the user's terminal, the account information provided by the user, which the user can edit upon activating an edit control. A determination is made as to whether the user wants to edit the information. If the user wants to edit the account, then the account information is provided in an edit mode. Otherwise, at state 920, the user is asked to confirm the account data. At state 922, the user is presented with a link, which when activated, causes a Web page to be presented via which the user can deposit funds into an account that can be used to find lottery ticket purchases. The user can enter a financial account identifier (e.g., a credit card number, a bank account number, etc.), and a maximum amount that can be expended on a given lottery and/or in a specified time period (e.g., a day, a week, a month, a year, etc.). At state 924, an "account established" confirmation communication is sent by the system to the user via an address provided by the user.

If, at state 914, a determination is made that the user has an account with the system, the process proceeds to state 926. At state 926, the user is asked to log in to their account (e.g., by providing a user ID and/or password). Optionally, at this time location and authentication verification is performed at this time, using one or more of the techniques described herein. At state 928, a user account user interface is transmitted to the user's terminal for display. For example, the account user interface can list lotteries that the user is eligible for (e.g., based on the user's residency and/or location), the user's pending bets and/or the results of recent bets, and/or a display a control via which the user can sign up for one or more alerts (e.g., an alert as to when a lottery jackpot reaches a predetermined level, when lottery winners are announced, an alert to remind the user to make picks for a lottery, etc.).

If, at state 930, the user indicates (e.g., by activating an appropriate control) that the user wants to subscribe to one or more alerts, the process proceeds to state 948, where the user selects one or more alerts that the user wants to subscribe to. At state 950, a list of the selected alerts is transmitted to the user terminal and the user is asked to confirm the selection. Once the user confirms the selection, the alert selection is stored by the system in the user's account record, and at state 952, a thank you user message is transmitted to the user. At state 954, an alert confirmation message is transmitted to the user (e.g., via email or SMS). If, at state 930, the user indicates that the user does not want to subscribe to any additional alerts, the process proceeds to end state 932.

At state 934, a determination is made (e.g., via an activation of an appropriate control) as to whether the user wished to play an online event (e.g., purchase one or more lottery tickets). If the user does not want to play, the process proceeds to end state 936. If the user wants to play, the process proceeds to 938, and a determination is made as to whether the user has sufficient funds (e.g., in a deposit account accessible by the system) to fund the lottery picks made by the user. If there are insufficient funds, the process proceeds to state 940, and the system prompts the user to add funds to the user's account. If there are sufficient funds, at state 942, a list of the user lottery ticket picks are presented to the user with corresponding costs, and the user is asked to confirm the ticket purchase. At state 944, a thank you message is presented to the user. At state 954, a ticket purchase confirmation message is transmitted to one or more destinations associated with the user.

Figure 10:
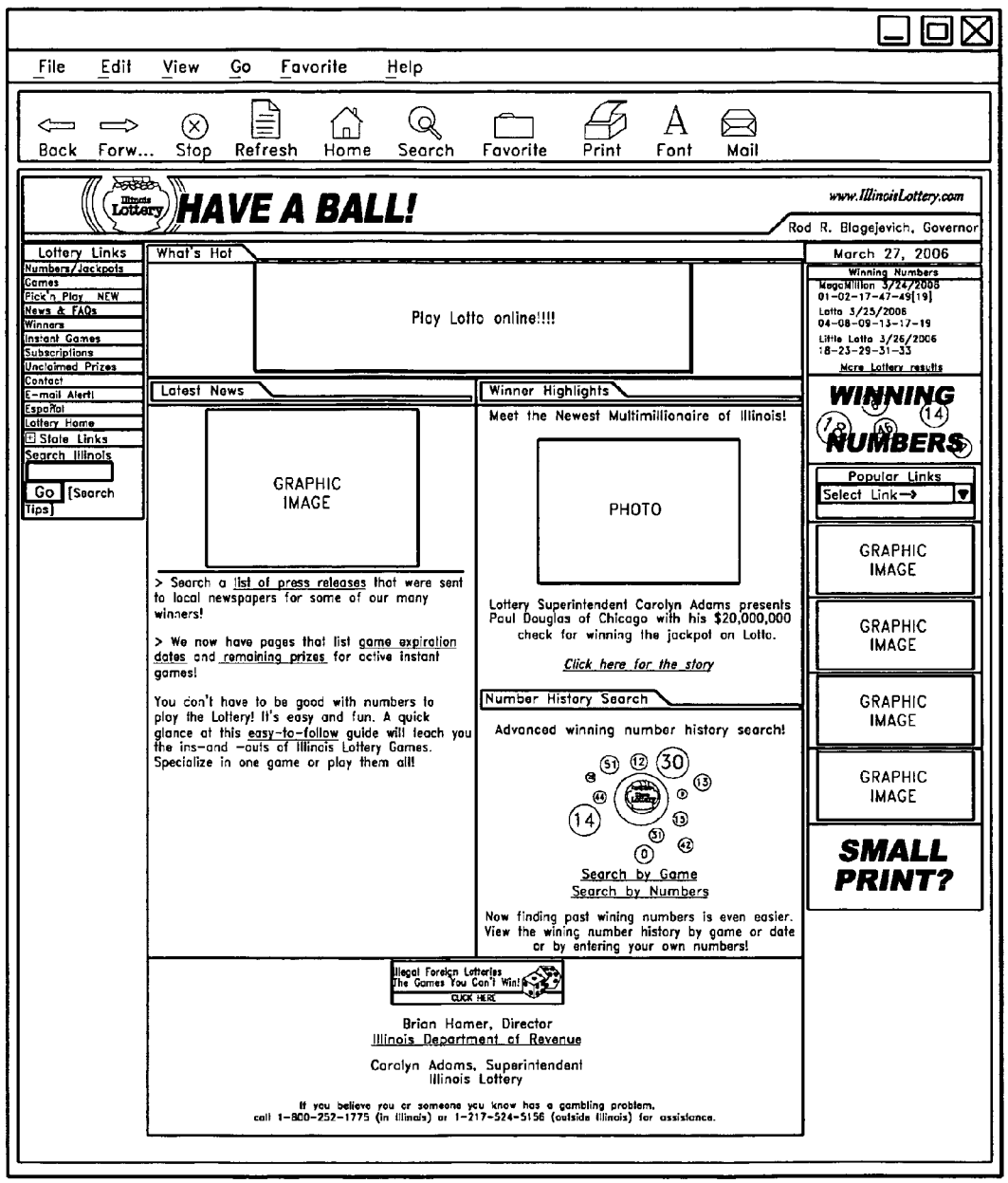

FIG. 10 illustrates an example user interface, which can be transmitted by the lottery system to a user terminal in the form of a Web page or otherwise. The Web page provides links to lottery-related news, links to user interfaces for active games, links to a lottery instructional guide, search links via which the user can search for previous winning numbers by game and/or search by number for games in which the number was a winner.

Figure 11:
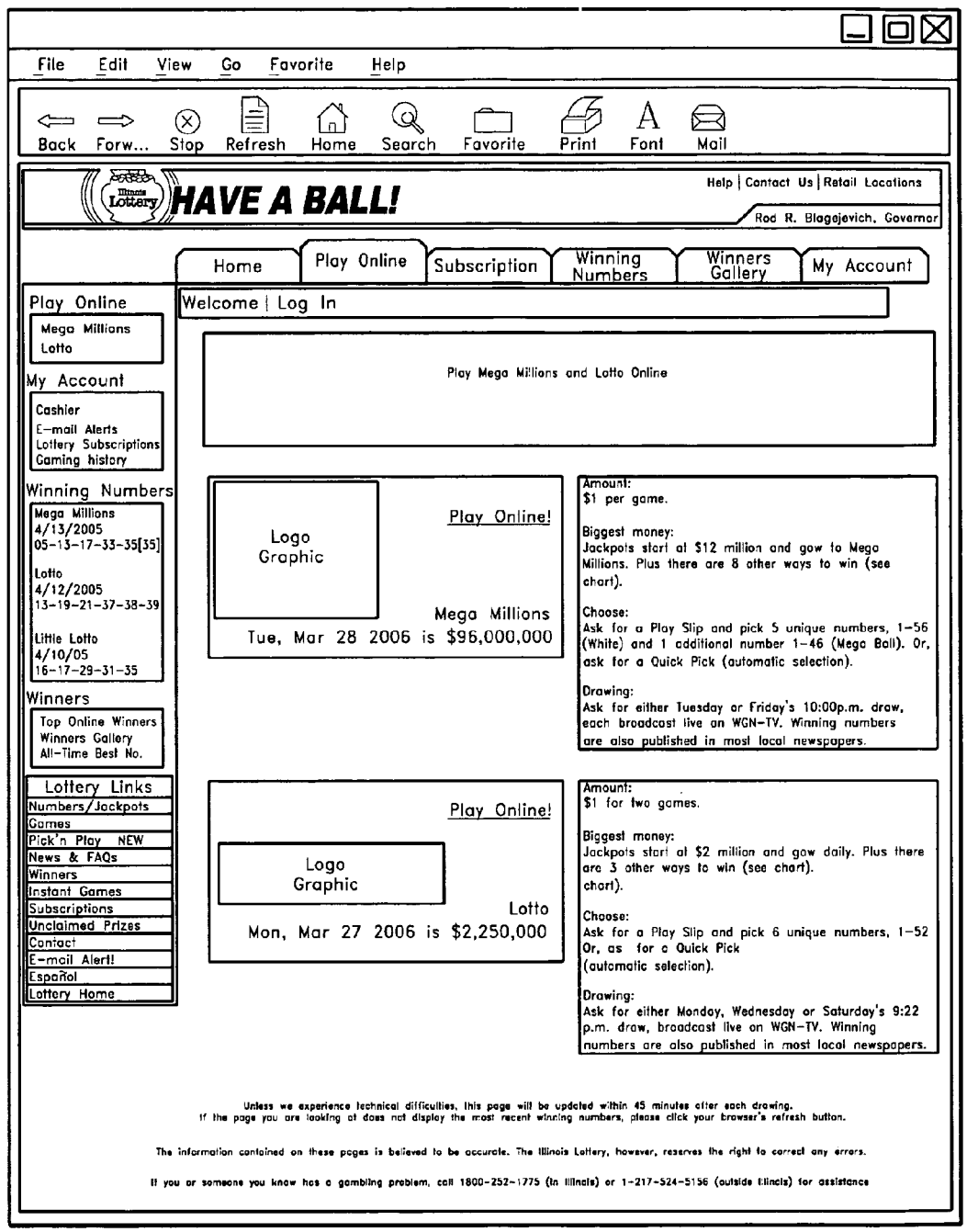

FIG. 11 illustrates an example account set-up form which can be transmitted by the lottery system over a network to a user terminal (e.g., in the form of a Web page). Fields are provided via which the user can enter the user's name, contact information (e.g., email address, physical address, phone number, phone type), gender, password, date of birth, driver license number or social security number, and/or other information. In this example, a check box is provided via which the user can indicate that the user agrees to be bound by rules associated with the account and with lottery rules. In addition, links are provided to a variety of lottery games, to news and faqs, to a list of winners, to lottery subscriptions, to unclaimed prizes, to an alert user interface, and so on. In addition, links are provided to different account user interfaces (e.g., a cashier user interface to arrange for account deposits/disbursements, an email subscription user interface, a lottery subscription user interface, a gaming history user interface, etc.). Information on recent lottery winning numbers and corresponding dates are also optionally displayed.

Figure 12:

FIG. 12 illustrates an example "play online" user interface via which the user can select one or more lotteries to play. In addition, information regarding betting amounts and current winnable amounts are also optionally presented.

Figure 13A:
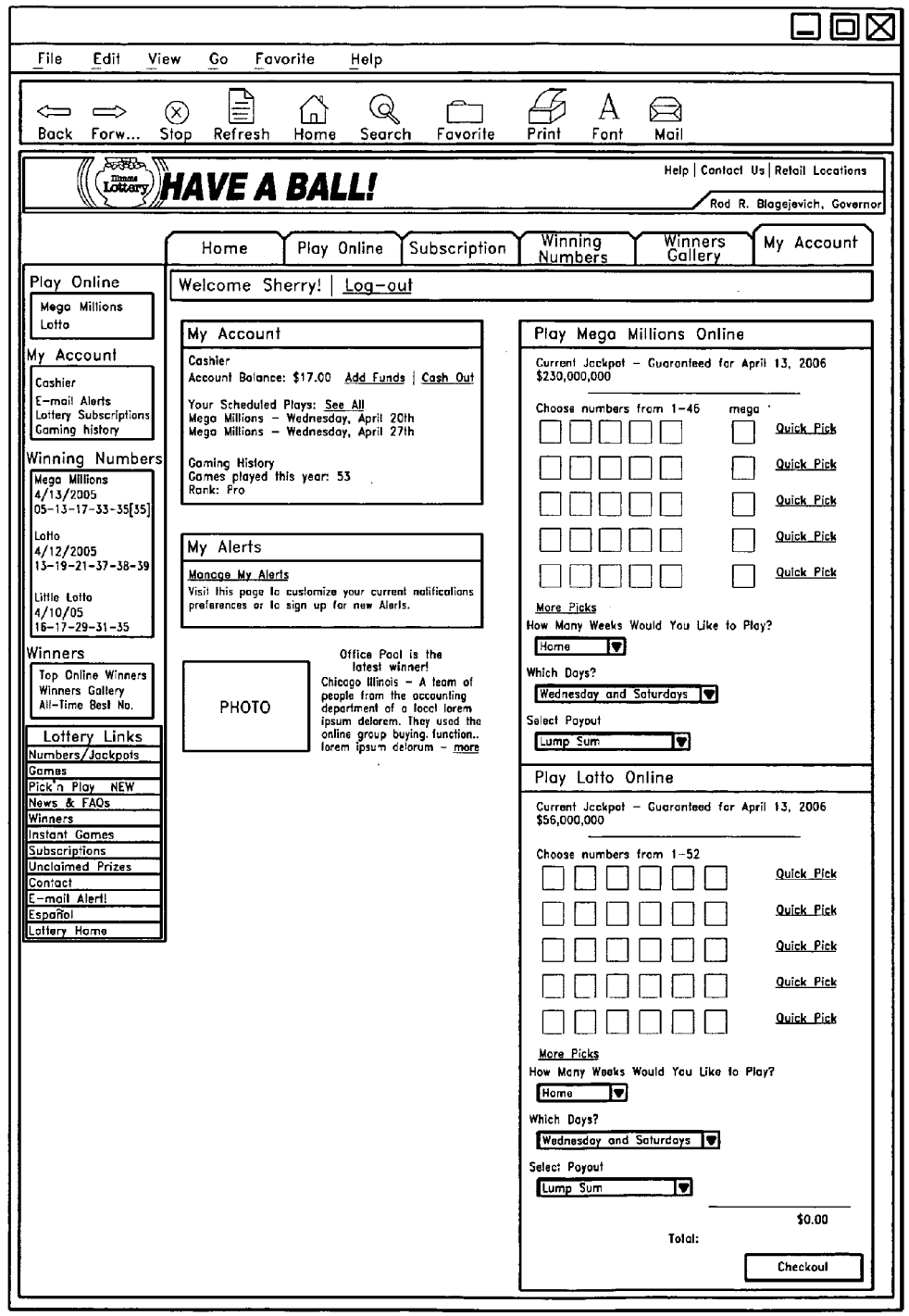

FIG. 13A illustrates an example accounts user interface. A cashier area is provided, including controls for adding funds to the user's account balance, and for cashing out the account balance. In addition, a scheduled plays area lists the pending lotteries for which the user has purchased picks, and the corresponding lottery drawing dates. A gaming history area lists the number of games the user has played in a specified time period (e.g., during the current year), and provides a player ranking indication based at least in part on the number of games played.

A "my alerts" area provides a link to a user interface via which the user can specify the user's current notification preferences and can sign up for new alerts. Fields are provided for one or more lotteries (e.g., Mega Millions, Lotto) via which the user can enter one or more sets of numbers, can elect to play an enhanced version of the lottery (e.g., mega), via which the user can indicate how many weeks the user wants to play, which days the user wants to play, and the payout type (e.g., lump sum, or annuity). Links ("quick pick" links) are also provided via which the user can request the system to generate numbers for the user.

Figure 13B:
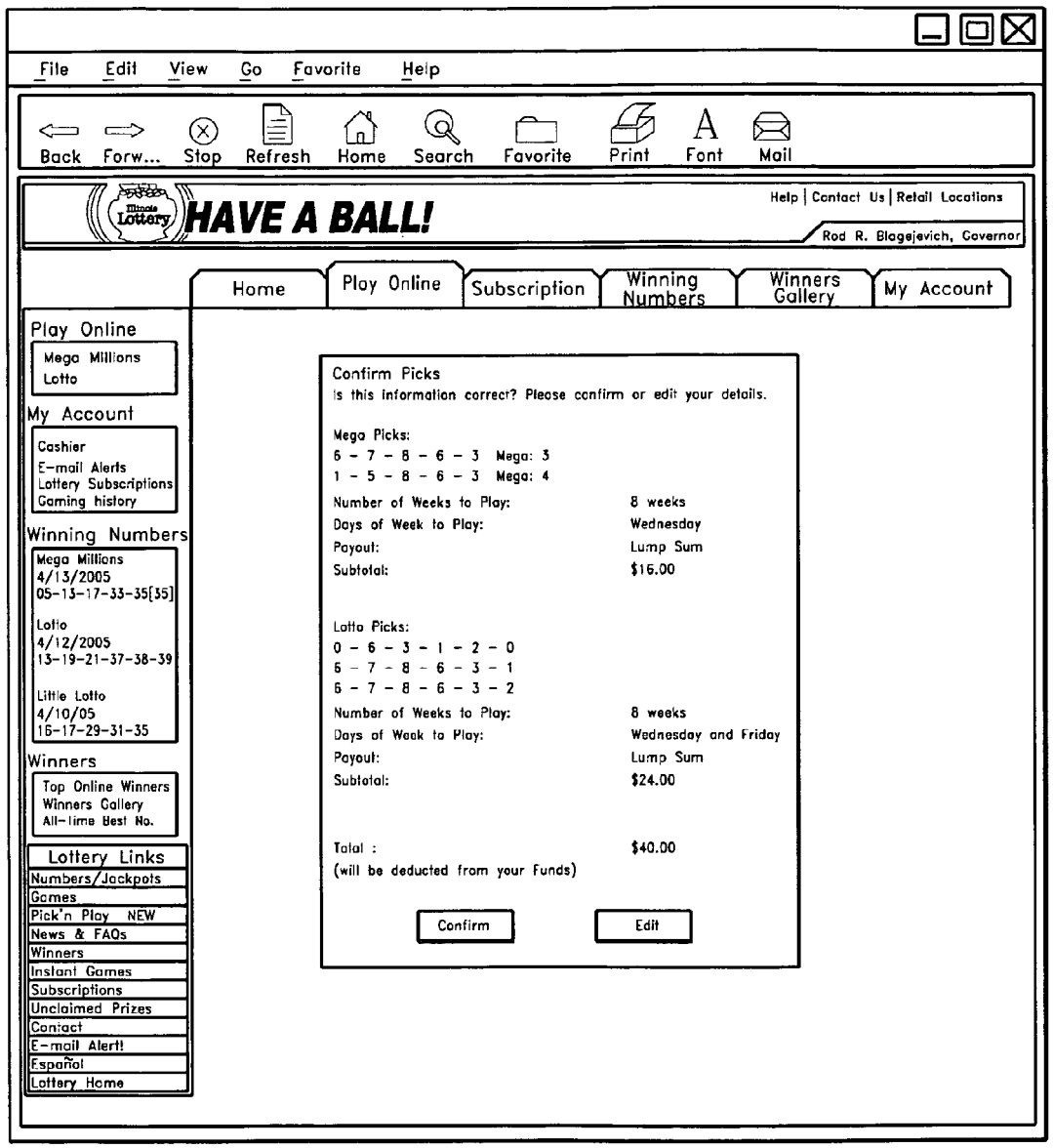

FIG. 13B illustrates an example confirmation user interface, which lists the lottery and number picks made by the user, and the selected number of weeks to play, days of week to play, payout type, subtotal for purchases for each game, and the total amount for all games. A confirm and edit controls are also provided.

Figure 14:
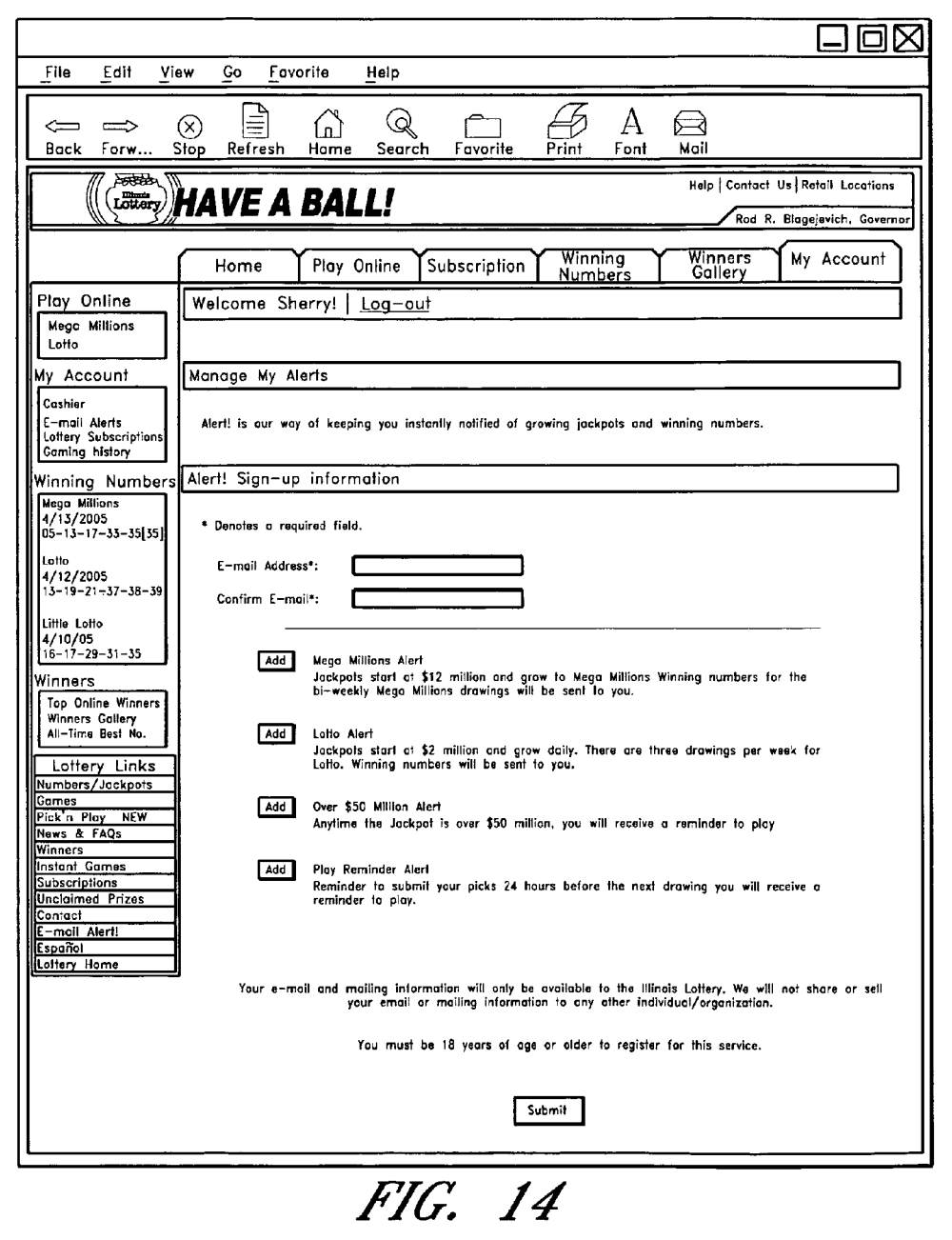

FIG. 14 illustrates an example alerts management user interface. Fields are provided via which the user can provide an alert address (e.g., and email address). Controls are provided via which the user can subscribe to drawing alerts for different lottery types (e.g., a mega millions alert, a lotto alert, etc.), alerts for when a lottery is over a specified amount (e.g., $50 million), and/or a play reminder alert (e.g., a reminder to submit picks a specified amount of time prior to a drawing).

Figure 15:
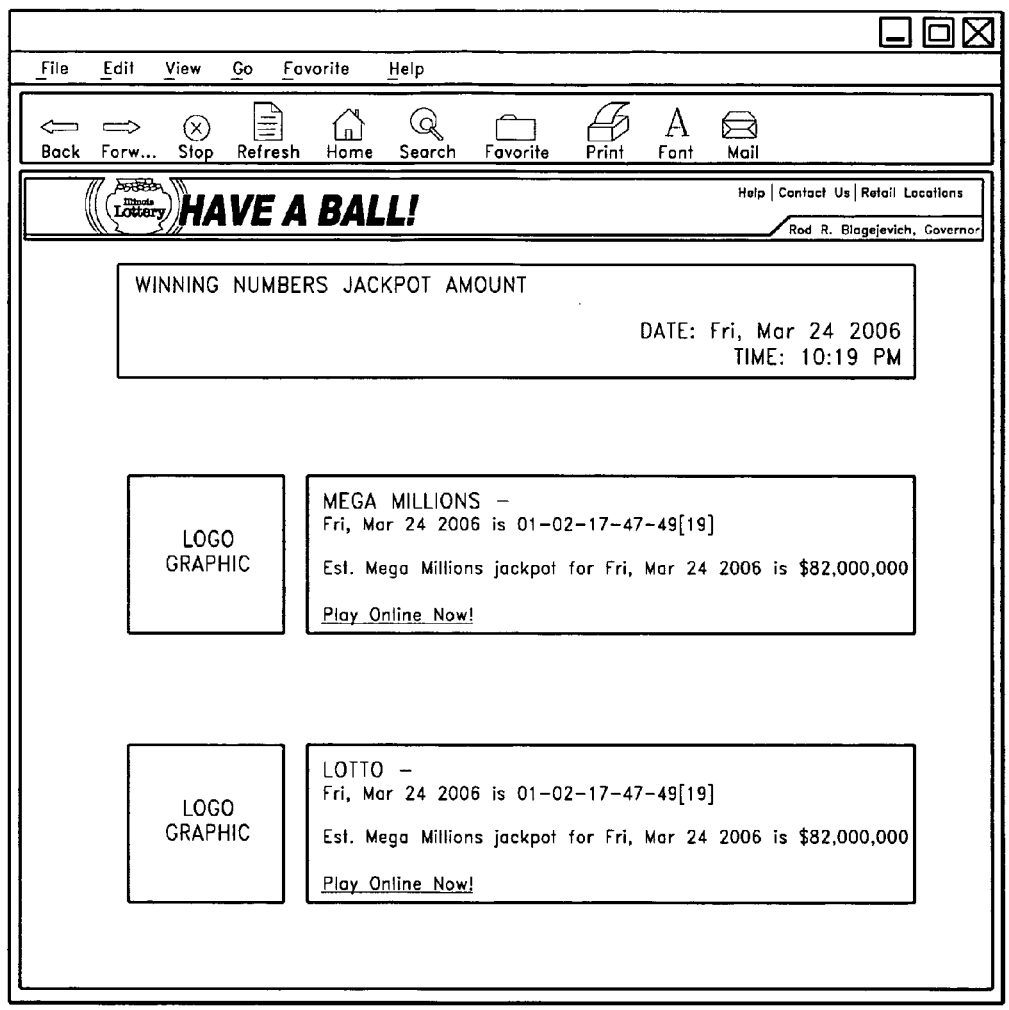

FIG. 15 illustrates a user interface, including links via which the user can select an online lottery to play. The user interface displays the drawing date and the estimated jackpot for the corresponding lotteries.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A method of processing location data for a computer terminal, the method comprising:
   receiving at a computer system from a first mobile computer terminal and/or from a communication system in communication with the first mobile computer terminal, global positioning satellite and/or cellular network location data, wherein the location data corresponds to the approximate location of the first mobile computer terminal;
   based at least in part on the location data, determining if the first mobile computer terminal is within a first area, wherein presence in the first area is needed in order to be authorized to access a first service, wherein the first service relates to acquisition of a first ticket for a sporting event or a concert event at a venue; and
   at least partly in response to failing to determine that the first mobile computer terminal is in the first area, transmitting a map to the first mobile computer terminal, the map including at least the first area, and inhibiting the acquisition of the first ticket for the event at the venue from the first mobile computer terminal;
   determining if a changed location of the first mobile computer terminal is within the first area;
   at least partly in response to determining that the changed location of the first mobile computer terminal is within the first area, enabling an acquisition of the first ticket for the event and inhibiting the acquisition of more than a predetermined quantity of tickets for the event by a user of the first mobile computer terminal.

2. The method as defined in claim 1, wherein the communication system includes a cellular network tower.

3. The method as defined in claim 1, wherein the first mobile computer terminal is a personal computer.

4. The method as defined in claim 1, wherein the first mobile computer terminal is a telephonic device.

5. The method as defined in claim 1, wherein determining if the first mobile computer terminal is within the first area further comprises determining if the first mobile computer terminal is in a first state.

6. The method as defined in claim 1, wherein the first mobile computer terminal is an interactive television.

7. The method as defined in claim 1, wherein determining if the first mobile computer terminal is within the first area further comprises determining if the first mobile computer terminal is in a selected set of states, wherein the selected set of states includes more than one state.

8. The method as defined in claim 1, wherein the first area is emphasized in the map.

9. The method as defined in claim 1, wherein the first area is emphasized in the map, and an indication is provided that at least one terminal is currently located at the first area.

10. The method as defined in claim 1, further comprising transmitting to the first mobile computer terminal directions to the first area.

11. The method as defined in claim 1, further comprising denying access to the first service via the first mobile computer terminal at least until the first mobile computer terminal is in the first area.

12. The method as defined in claim 1, determining whether the received location data for the first mobile computer terminal is ambiguous as to whether the first mobile computer terminal is within the first area or outside of the first area, and at least partly in response, inhibiting the acquisition of the first ticket for the event.

13. The method as defined in claim 1, wherein the computer system cannot determine whether the first mobile computer terminal is in or is outside the first area.

14. The method as defined in claim 1, wherein boundaries of the first area are defined by a governmental entity.

15. The method as defined in claim 1, wherein the first service relates to purchase of the first ticket.

16. The method as defined in claim 1, further comprising:
   assessing a characteristic of the user to determine whether the user is eligible to acquire the first event ticket,
   wherein acquisition of the first ticket for the event is inhibited upon determining that the user is not eligible to acquire the first ticket.

17. The method as defined in claim 16, wherein the assessment includes determining whether an age of the user satisfies age restrictions for the event.

18. The method as defined in claim 16, wherein the characteristic of the user is received from a third party.

19. A non-transitory computer readable media that stores a program, said program capable of being executed by a computer to cause the computer to:
   receive at a computer system global positioning satellite and/or cellular network location data, wherein the location data corresponds to the approximate location of a first mobile computer terminal;
   based at least in part on the location data, determine if the first mobile computer terminal is within a first area, wherein presence in the first area is needed in order to be authorized to access a first service, wherein the first service relates to acquisition of a first ticket for a sporting event or a concert event at a venue; and
   at least partly in response to failing to determine that the first mobile computer terminal is in the first area, transmit a map to the first mobile computer terminal, the map including at least the first area, and inhibiting the acquisition of the first ticket for the event at the venue from the first mobile computer terminal;
   determining if a changed location of the first mobile computer terminal is within the first area;
   at least partly in response to determining that the changed location of the first mobile computer terminal is within the first area, enabling an acquisition of the first ticket for the event and inhibiting the acquisition of more than a predetermined quantity of tickets for the event by a user of the first mobile computer terminal.

20. The non-transitory computer readable media as defined in claim 19, wherein said program is capable of being executed by a computer to cause the computer to determine if the first mobile computer terminal is in a first state.

21. The non-transitory computer readable media as defined in claim 19, wherein said program is capable of being executed by a computer to cause the computer to determine if the first mobile computer terminal is in a selected set of states, wherein the selected set of states includes more than one state.

22. The non-transitory computer readable media as defined in claim 19, wherein the first area is emphasized in the map.

23. The non-transitory computer readable media as defined in claim 17, wherein the first area is emphasized in the map, and an indication is provided that at least one terminal is located at the first location which is configured to access the first service.

24. The non-transitory computer readable media as defined in claim 19, wherein said program is capable of being executed by a computer to cause directions to the first area to be transmitted to the first mobile computer terminal.

25. The non-transitory computer readable media as defined in claim 19, wherein said program is capable of being executed by a computer to cause the computer to deny the first mobile computer terminal access to the first service at least until the first mobile computer terminal is in the first area.

26. The non-transitory computer readable media as defined in claim 19, wherein the program is further capable of being executed by a computer to cause the computer to:
    assess a characteristic of the user to determine whether the user is eligible to acquire the first event ticket,
    wherein acquisition of the first ticket for the event is inhibited upon determining that the user is not eligible to acquire the first ticket.

27. The non-transitory computer readable media as defined in claim 26, wherein the assessment includes determining whether an age of the user satisfies age restrictions for the event.

28. The non-transitory computer readable media as defined in claim 26, wherein the characteristic of the user is received from a third party.

29. A method of processing location data for a computer terminal, the method comprising:
    receiving at a computer system location data corresponding to the approximate physical location of a first terminal;
    based at least in part on the location data, determining if the first terminal is within a first area, wherein presence in the first area is needed in order to be entitled to access a first service related to the acquisition of a first ticket for a sporting event or a concert event; and
    at least partly in response to failing to determine that the first terminal is in the first area, transmitting to the first terminal location information indicating that the first ticket may be acquired in the first area, transmitting a map to the first mobile computer terminal, the map including at least the first location, and inhibiting the acquisition of the first event ticket from the first terminal;
    determining if a changed location of the first terminal is within the first area;
    at least partly in response to determining that the changed location of the first terminal is within the first area, enabling an acquisition of the first event ticket and inhibiting the acquisition of more than a predetermined quantity of tickets for the event by a user of the first terminal.

30. The method as defined in claim 29, wherein the location data is related to global positioning satellite data.

31. The method as defined in claim 29, wherein the location data is related to cellular tower location data.

32. The method as defined in claim 29, wherein the location data is related to an Internet protocol address.

33. The method as defined in claim 29, wherein the location data received while the first terminal is at a first location includes at least two of: global positioning satellite data, cellular phone network related data, Internet protocol address data.

34. The method as defined in claim 29, wherein the first location is selected at least partly based on a zip code of the first location.

35. The method as defined in claim 29, wherein the first location is selected at least partly based on an estimated distance from the first terminal.

36. The method as defined in claim 29, wherein the first location is selected at least partly based on a zip code of the first location and on a zip code corresponding to an estimated location of the first terminal.

37. The method as defined in claim 29, wherein the first location is selected at least partly based on at least a portion of an address stored in an account record of the user.

38. The method as defined in claim 29, wherein the first location is selected at least partly based on a zip code stored in an account record of the user, wherein the user is associated with the first terminal.

39. The method as defined in claim 29, wherein the first terminal is a personal computer.

40. The method as defined in claim 29, wherein the first terminal is a telephonic device.

41. The method as defined in claim 29, wherein the first terminal is an interactive television.

42. The method as defined in claim 29, wherein determining if the first terminal is within the first area further comprises determining if the first terminal is in a first state.

43. The method as defined in claim 29, wherein determining if the first terminal is within the first area further comprises determining if the first terminal is in a selected set of states, wherein the selected set of states includes more than one state.

44. The method as defined in claim 29, wherein the first location is emphasized in the map.

45. The method as defined in claim 29, wherein the first location is emphasized in the map, and an indication is provided that at least one terminal is located at the first location.

46. The method as defined in claim 29, further comprising transmitting to the first terminal directions to the first location.

47. The method as defined in claim 29, further comprising denying access to the first service via the first terminal until the first terminal is in the first area.

48. The method as defined in claim 29, further comprising determining whether the received location data for the first terminal ambiguous as to whether the first terminal is within the first area or outside of the first area, and at least partly in response, inhibiting the acquisition of the first ticket for the event.

49. The method as defined in claim 29, wherein the computer system cannot determine whether the first terminal is in or is outside the first area.

50. The method as defined in claim 29, wherein boundaries of the first area are defined by a governmental entity.

51. The method as defined in claim 29, further comprising:
    assessing a characteristic of the user to determine whether the user is eligible to acquire the first event ticket, wherein acquisition of the first ticket for the event is inhibited upon determining that the user is not eligible to acquire the first ticket.

52. The method as defined in claim 51, wherein the assessment includes determining whether an age of the user satisfies age restrictions for the event.

53. The method as defined in claim 51, wherein the characteristic of the user is received from a third party.

* * * * *